US010303244B2

(12) United States Patent
Hashimoto

(10) Patent No.: US 10,303,244 B2
(45) Date of Patent: May 28, 2019

(54) INFORMATION PROCESSING APPARATUS, INFORMATION PROCESSING METHOD, AND COMPUTER PROGRAM

(71) Applicant: Sony Interactive Entertainment Inc., Tokyo (JP)

(72) Inventor: Tatsuaki Hashimoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 157 days.

(21) Appl. No.: 15/433,240

(22) Filed: Feb. 15, 2017

(65) Prior Publication Data

US 2017/0351325 A1 Dec. 7, 2017

(30) Foreign Application Priority Data

Jun. 7, 2016 (JP) .................................. 2016-113855

(51) Int. Cl.
*G06F 3/01* (2006.01)
*G06F 3/16* (2006.01)
(Continued)

(52) U.S. Cl.
CPC ............... *G06F 3/012* (2013.01); *A63F 13/00* (2013.01); *A63F 13/211* (2014.09); *A63F 13/213* (2014.09); *A63F 13/215* (2014.09); *A63F 13/332* (2014.09); *A63F 13/428* (2014.09); *A63F 13/52* (2014.09); *G06F 3/017* (2013.01); *G06F 3/0346* (2013.01); *G06F 3/165* (2013.01); *A63F 2300/105* (2013.01); *A63F 2300/1081* (2013.01); *A63F 2300/1093* (2013.01);
(Continued)

(58) Field of Classification Search
CPC ........ G06F 3/012; G06F 3/017; G06F 3/0346; G06F 3/0414–3/0418; G06F 3/043–3/0436; G06F 3/16–3/167; G02B 27/017; G02B 27/0172; G02B 27/0176; G02B 2027/0174; G02B 2027/0178; A63F 13/211; A63F 13/213; A63F 13/215; A63F 13/33; A63F 13/428; A63F 13/52; A63F 2300/105; A63F 2300/1081; A63F 2300/1093; A63F 2300/406; A63F 2300/8082
See application file for complete search history.

(56) References Cited

U.S. PATENT DOCUMENTS 8,319,746 B1 * 11/2012 Ho .................... G06F 3/0418
345/156
2014/0118829 A1 * 5/2014 Ma ...................... G02B 27/0172
359/567

* cited by examiner

*Primary Examiner* — Nathan Danielsen
(74) *Attorney, Agent, or Firm* — Katten Muchin Rosenman LLP

(57) ABSTRACT

An information processing apparatus includes: a storage block configured to store at least one of a correlation between a pattern of a vibration detected on a head-mounted display as a result of a predetermined contact action and a type of data processing and a correlation between a pattern of an image outputted from an image-taking apparatus, the outputting being caused by a predetermined gesture action, and a type of data processing; an acquisition block configured to acquire at least one of information related with the detected vibration and the outputted image; and a data processing block configured to, according to each of the correlations stored in the storage block, execute at least one of data processing of the type corresponding to the detected vibration and data processing of the type corresponding to the outputted image.

10 Claims, 18 Drawing Sheets

(51) Int. Cl.
*G06F 3/0346* (2013.01)
*A63F 13/215* (2014.01)
*A63F 13/52* (2014.01)
*A63F 13/428* (2014.01)
*A63F 13/211* (2014.01)
*A63F 13/213* (2014.01)
*A63F 13/332* (2014.01)
*A63F 13/00* (2014.01)
*G02B 27/01* (2006.01)
*G02B 27/00* (2006.01)

(52) U.S. Cl.
CPC . *A63F 2300/406* (2013.01); *A63F 2300/8082* (2013.01); *G02B 27/0093* (2013.01); *G02B 27/017* (2013.01); *G02B 2027/014* (2013.01); *G02B 2027/0138* (2013.01); *G02B 2027/0141* (2013.01); *G02B 2027/0187* (2013.01)

INFORMATION PROCESSING APPARATUS, INFORMATION PROCESSING METHOD, AND COMPUTER PROGRAM

BACKGROUND

The present disclosure relates to a data processing technology, especially, to an information processing apparatus, an information processing method, and a computer program.

A head-mounted display (hereafter referred to also as an HMD), worn on the head of a user, provides a virtual reality (VR) world to the user. These days, applications are marketed that allow a user to play a game while looking at a screen displayed on the HMD. With conventional stationary displays such as television receivers, a user's range of view field also extends outside a screen, so that the user sometimes cannot concentrate on the screen or cannot fully enjoy the sense of immersion in the game being played. By contrast, wearing an HMD makes a user see only a video displayed on the HMD, thereby giving effects of enhancing the sense of immersion and game entertainment.

SUMMARY

Wearing an HMD of non-transmission type that covers both eyes of a user almost makes it impossible for the user to see outside. Therefore, the inventors hereof considered that a user wearing an HMD sometimes is difficult to enter commands into the system of the HMD through a controller that the user is holding.

Therefore, the present disclosure has been made in view of above circumstances and it is desirable to provide a technology of providing a manipulation input method that is suitable for users wearing head-mounted displays.

According to one embodiment of the present disclosure, there is provided an information processing apparatus including: a storage block configured to store at least one of a correlation between a pattern of a vibration detected on a head-mounted display as a result of a predetermined contact action done by a user wearing the head-mounted display onto an external surface of a case of the head-mounted display and a type of data processing related with the head-mounted display and a correlation between a pattern of an image outputted from an image-taking apparatus that takes an image of the head-mounted display, the outputting being caused by a predetermined gesture action done by the user wearing the head-mounted display in the proximity thereof, and a type of data processing related with the head-mounted display; an acquisition block configured to acquire at least one of information related with the vibration detected on the head-mounted display and the image outputted from the image-taking apparatus; and a data processing block configured to, according to each of the correlations stored in the storage block, execute at least one of data processing of the type corresponding to the vibration detected on the head-mounted display and data processing of the type corresponding to the image outputted from the image-taking apparatus.

According to another embodiment of the present disclosure, there is provided an information processing method including: acquiring at least one of information related with a vibration detected on a head-mounted display and an image outputted from an image-taking apparatus that takes an image of the head-mounted display; and executing at least one of data processing operations of executing data processing of a type corresponding to a vibration indicated by the information acquired in the acquiring in accordance with data in which a pattern of a vibration detected on the head-mounted display as a result of a predetermined contact action onto an external surface of a case of the head-mounted display by a user wearing the head-mounted display is related beforehand with a type of data processing related with the head-mounted display and executing data processing of a type corresponding to an image acquired in the acquiring in accordance with data in which a pattern of an image outputted from the image-taking apparatus as a result of a predetermined gesture action done by the user wearing the head-mounted display in the proximity thereof is related beforehand with a type of data processing related with the head-mounted display.

It should be noted that those obtained by converting any combinations of the components described above and the expressions of the present disclosure between a system, a program, a storage medium storing the program, and so on are also valid as modes of the present disclosure.

According to the embodiments of the present disclosure, a manipulation input method is provided that is suitable to a user wearing a head-mounted display.

BRIEF DESCRIPTION OF THE DRAWINGS

These and other objects of the present disclosure will become apparent from the following description of embodiments with reference to the accompanying drawings in which.

DETAILED DESCRIPTION OF THE PREFERRED EMBODIMENTS

Prerequisite Technologies

Figure 1:
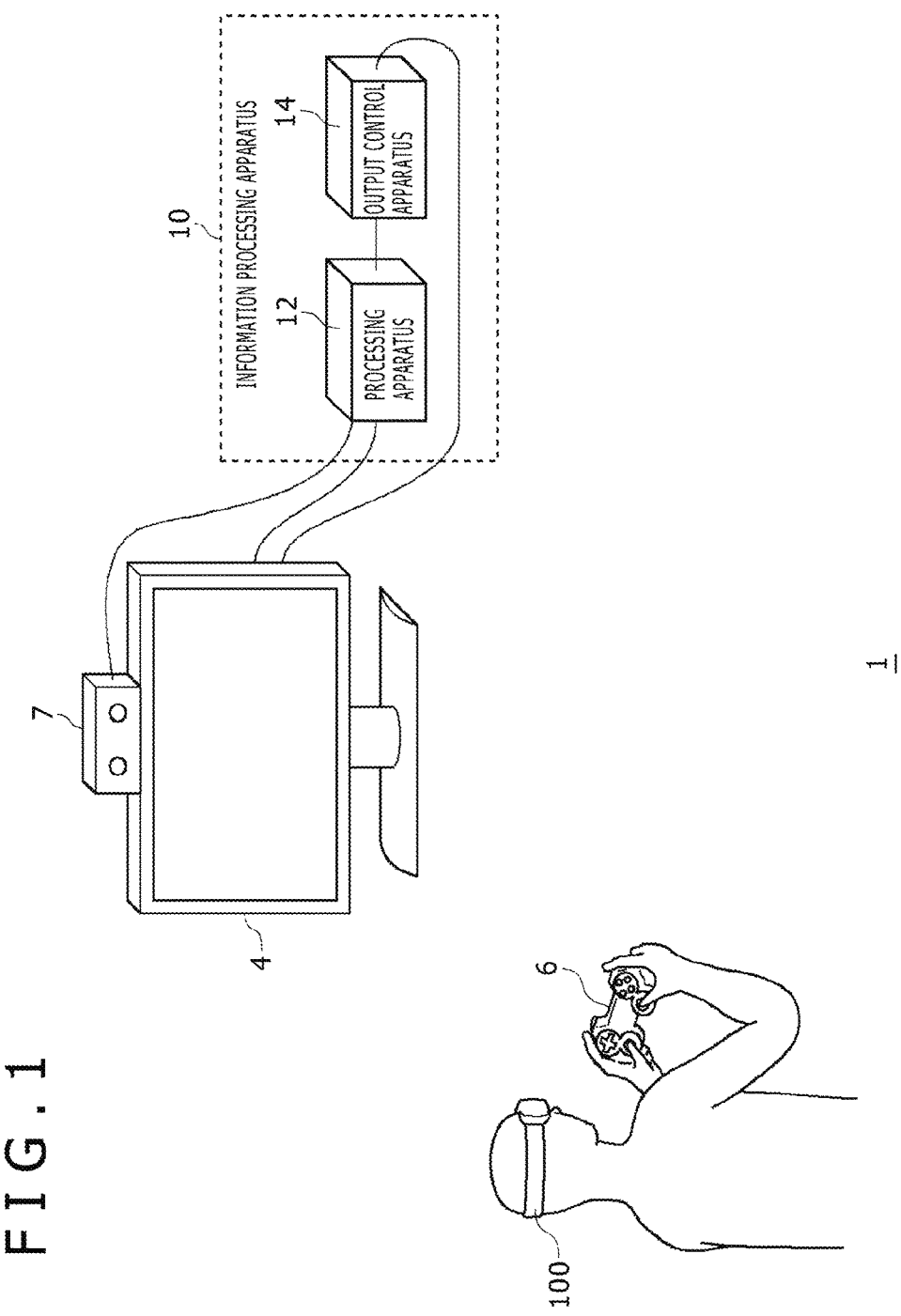
FIG. 1 is a schematic diagram illustrating one example of a configuration of an information processing system practiced as one embodiment of the disclosure.

Now, referring to FIG. 1, there is shown a schematic diagram illustrating one example of a configuration of an information processing system 1 practiced as one embodiment of the disclosure. The information processing system 1 has an information processing apparatus 10, a head-mounted display (HMD) 100 that is worn on the head of a user, an input apparatus 6 that is manipulated by the user with his or her hand fingers, an image taking apparatus 7 configured to take an image of the user wearing the HMD 100, and an output apparatus 4 for displaying the taken image.

In one embodiment, the information processing apparatus 10 has a processing apparatus 12 and an output control apparatus 14. The processing apparatus 12 is a terminal apparatus configured to receive manipulation information done on the input apparatus 6 by a user and execute a variety of applications, such as games. The processing apparatus 12 and the input apparatus 6 may be connected with a cable or by a known wireless communication technology. The output control apparatus 14 is a processing unit that outputs image data to the HMD 100. The output control apparatus 14 and the HMD 100 may be connected with a cable or by a known wireless communication technology.

The image taking apparatus 7 takes an image of the user wearing the HMD 100 and provides the taken image to the processing apparatus 12. The image taking apparatus 7 may be a stereoscopic camera. The HMD 100 has a marker (a light emitting diode (LED) for tracking) for realizing tracking of the user head as described hereinbelow and the processing apparatus 12 detects a movement of the HMD 100 on the basis of the position of the image-taken marker. It should be noted that the HMD 100 also has an attitude sensor (an acceleration sensor or a gyro sensor) and the processing apparatus 12 acquires from the HMD 100 sensor information detected by the attitude sensor so as to realize precision tracking processing along with the use of a taken image of the marker.

With the information processing system 1, in order for the user to watch an image displayed on the HMD 100, the output apparatus 4 is not necessarily required, but the output control apparatus 14 or the processing apparatus 12 may output, from the output apparatus 4, a same image as the image to be displayed on the HMD 100. This setup allows another user to watch, on the output apparatus 4, an image being watched by the user on the HMD 100. It should be noted that, as described hereinbelow, an image to be displayed on the HMD 100 is corrected in distortion of an optical lens, so that an image not corrected in distortion may need to be outputted from the output apparatus 4.

In the information processing system 1, the processing apparatus 12, the output apparatus 4, the input apparatus 6 and the image taking apparatus 7 may build a game system of a conventional type. In this case, the processing apparatus 12 may be a game apparatus that executes applications, such as games, while the input apparatus 6 may be a device configured to supply user manipulation information to the processing apparatus 12, such as a game controller, a keyboard, a mouse, or a joy stick. Adding the output control apparatus 14 and the HMD 100 to these game system components configures the information processing system 1 that executes virtual reality (VR) applications.

It should be noted that the functions realized by the output control apparatus 14 may be assembled in the processing apparatus 12 as part of the functions of VR applications. That is, the information processing apparatus 10 may be configured by one unit of the processing apparatus 12 or by the processing apparatus 12 and the output control apparatus 14. In what follows, the functions of the processing apparatus 12 and the output control apparatus 14 that are necessary for the realization of VR applications are collectively described as functions of the information processing apparatus 10.

The information processing apparatus 10 generates image data to be displayed on the HMD 100. In the embodiment, the information processing apparatus 10 prepares an omnidirectional 360-degree panoramic image of vertical and horizontal directions taken by an omnidirectional camera and displays, on the HMD 100, an image generated on the basis of a line-of-sight direction defined by the attitude of the HMD 100 worn on the head of the user. It should be noted that display content may be either a still image or a moving image. Images are not limited to those really taken; for example, images may be those drawn realtime by a game application.

The HMD 100, worn by a user on his or her head, displays, through an optical lens, an image on a display panel located in front of the eyes of the user. The HMD 100 displays an image for the left eye on the left half of the display panel and an image for the right eye on the right half of the display panel, independently. These images form a parallax image as seen from the left and right viewpoints and are displayed on the respective left and right areas obtained by dividing the display panel in halves, thereby providing stereoscopy. It should be noted that the user watches the display panel through an optical lens, so that the information processing apparatus 10 supplies the image data corrected beforehand in the optical distortion caused by the lens to the HMD 100. In the information processing apparatus 10, the processing of optical distortion correction may be done by either the processing apparatus 12 or the output control apparatus 14.

Figure 2:
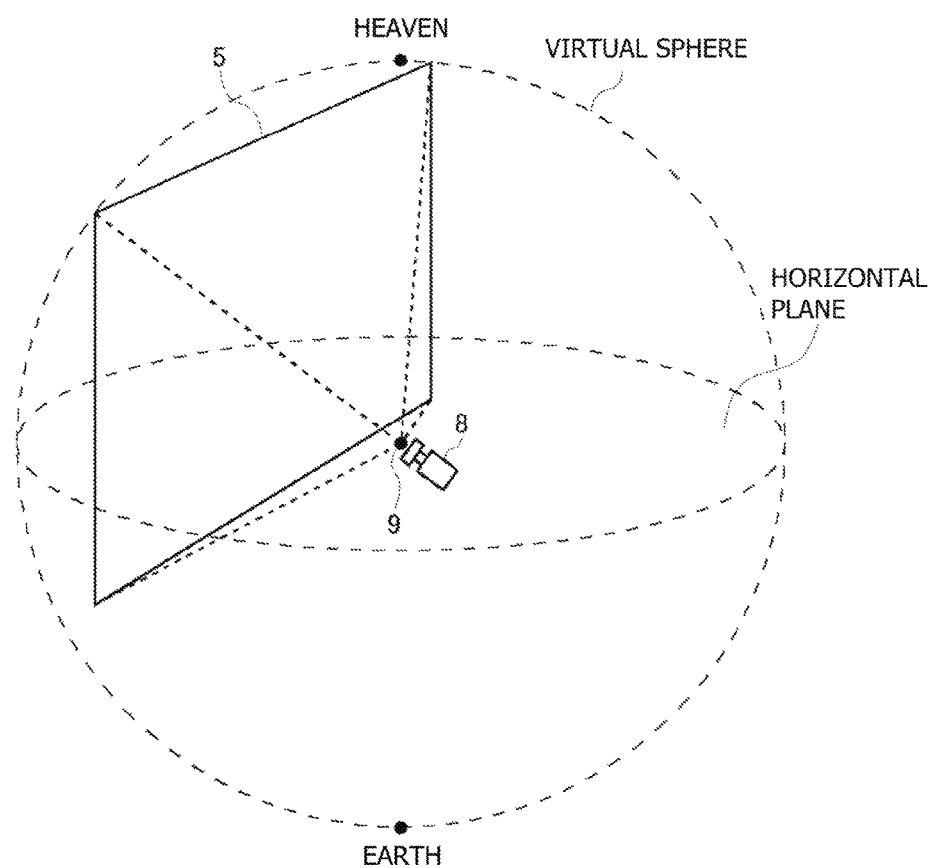
FIG. 2 is a diagram illustrating rendering processing in an information processing apparatus.

Referring to FIG. 2, there is shown a diagram illustrating rendering processing to be executed in the information processing apparatus 10. In a VR application of the embodiment, a user is positioned at the center of a sphere to realize a virtual environment in which visible images are changed by changing the directions of the user's line-of-sight. A content image that is an image material is attached to an inner circumferential surface of a virtual sphere around a center point 9 at which the user is located. Here, the content image is an omnidirectional 360-degree panoramic image of vertical and horizontal directions taken by an omnidirectional camera and is attached to the inner circumferential surface of the virtual sphere such that the heaven-earth of the content image matches the heaven-earth of the virtual sphere. Consequently, the heaven-earth of a user's real world comes in match with the heaven-earth of a video world to be provided to the HMD 100, thereby realizing a VR application that reproduces a realistic video world.

By executing user head tracking processing, the information processing apparatus 10 detects the rotational angle and a tilt of the user head (actually, the HMD 100). Here, the rotational angle of the HMD 100 is a rotational angle to the reference direction on the horizontal plane and the reference direction may be set as a direction in which the HMD 100 for example is directed when the power thereto is turned on. The tilt of the HMD 100 is a tilt angle to the horizontal plane. The head tracking processing may be executed by a known technology; the information processing apparatus 10 can detect the rotational angle and the tilt of the HMD 100 only from sensor information detected by the attitude sensor of the HMD 100 and, by executing image analysis on the marker (the tracking LED) of the HMD 100 taken by the image taking apparatus 7, detect the rotational angle and the tilt of the HMD 100 with precision.

In accordance with the detected rotational angle and tilt of the HMD 100, the information processing apparatus 10 defines an attitude of a virtual camera 8 in the virtual sphere. The virtual camera 8 is arranged so as to take an image of the inner circumferential surface of the virtual sphere from the center point 9 thereof and the information processing apparatus 10 matches the detected rotational angle and tilt with the rotational angle and tilt of an optical axis of the virtual camera 8 in the virtual sphere. The information processing apparatus 10 acquires a taken image 5 of the virtual camera 8, namely, executes rendering processing, executes optical distortion correction for an optical lens, and then supplies resultant image data to the HMD 100. It should be noted that, in FIG. 2, one virtual camera 8 is shown; actually, however, two virtual cameras 8 for the left eye and the right eye are arranged to generate the image data given by each camera.

Figure 3:
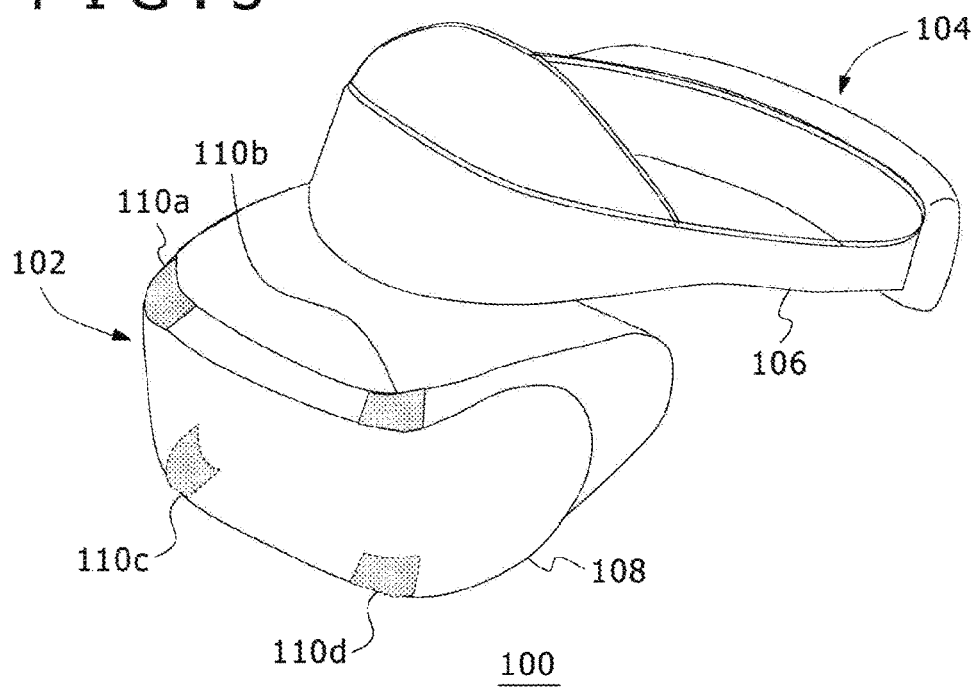
FIG. 3 is a perspective view illustrating one example of an external form of an HMD.

Referring to FIG. 3, there is shown a diagram illustrating one example of an external form of the HMD 100. In this example, the HMD 100 includes an output mechanism block 102 and a wearing mechanism block 104. The wearing mechanism block 104 includes a wearing band 106 for fixing the HMD 100 fully around the head of a user. The wearing band 106 has a material or a structure that allows the user to adjust the length of the band in match with the periphery of the user head.

The output mechanism block 102 includes a case 108 formed so as to cover the left and right eyes with the HMD 100 worn on the user and internally has a display panel at a position opposite to the eyes at the time of wearing. The display panel is a display block configured to present a VR image to the view field of the user. The display panel may be a known display apparatus and realized by a liquid crystal display or an organic electroluminescence (EL) panel, for example. Inside the case 108, a pair of left and right optical lenses arranged between the display panel and the user eyes at the time of wearing of the HMD 100 so as to expand a view angle of the user. In addition, the HMD 100 may have speakers or earphones at positions corresponding to the ears of the user when worn on the user.

The case 108 externally has a light-emitting markers 110a, 110b, 110c, and 110d. In this example, tracking LEDs are used for these light-emitting markers 110; it is also practicable to use other kinds of markers. In any case, any markers that can be taken by the image taking apparatus 7 and the taken images are image-analyzable by the information processing apparatus 10 may be used. The number of light-emitting markers 110 and the arrangement thereof are not especially limited; however, it is necessary to provide an amount and arrangement that, when taken and image-analyzed, allow the detection of the attitude (rotational angle and tilt) of the HMD 100. In the illustrated example, the light-emitting markers 110 are arranged in four corners of the front surface of the case 108. Further, in order to allow image taking when the user turns his or her back toward the image taking apparatus 7, the light-emitting markers 110 may be arranged on the sides or rear of the wearing band 106.

The HMD 100 may be connected to the information processing apparatus 10 with a cable or by a known wireless communication technology. The HMD 100 transmits sensor information detected by the attitude sensor to the information processing apparatus 10 and receives image data generated by the information processing apparatus 10, displaying the received image data on the display panel.

It should be noted that the HMD 100 shown in FIG. 3 is a display apparatus that fully covers both eyes, namely, the display apparatus of immersive type (or non-transmission type); it is also practicable to use a display apparatus of transmission type. The HMD 100 may be of a hat form as illustrated or an eye-glasses form.

Figure 4:
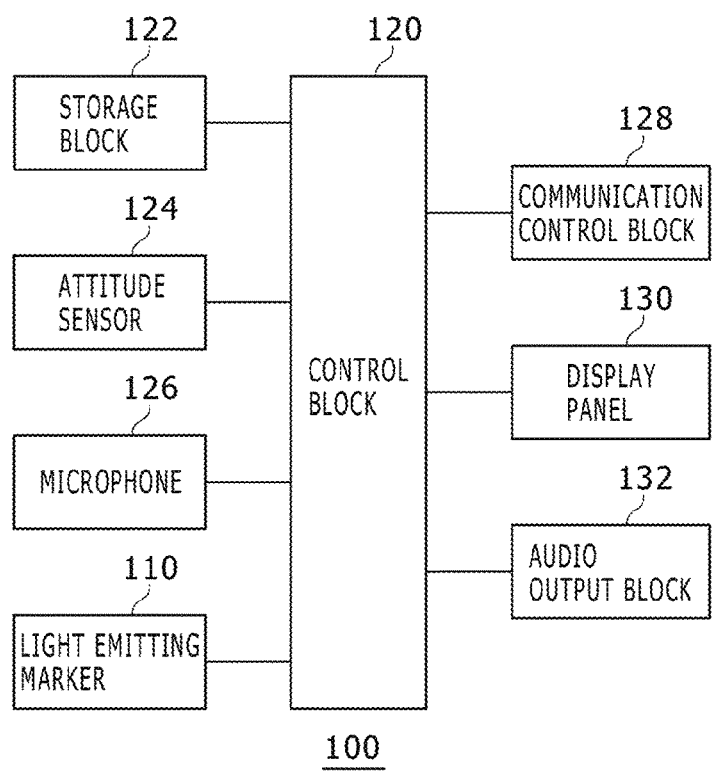
FIG. 4 is a block diagram illustrating functional blocks of the HMD.

Referring to FIG. 4, there is shown a block diagram illustrating functional blocks of the HMD 100. A control block 120 is a main processor configured to process image data, audio data, sensor information, and other various kinds of data and commands and outputs the processed data and commands. A storage block 122 temporarily stores data and commands that are processed by the control block 120. An attitude sensor 124 detects attitude information such as rotational angles and tilts of the HMD 100. The attitude sensor 124 includes at least a three-axis acceleration sensor and a three-axis gyro sensor. The light-emitting markers 110 are LEDs that are mounted on the wearing band 106 and the case 108 of the HMD 100.

A microphone 126 detects a sound (namely, vibration of air) and converts the detected sound into electrical signals. The microphone 126 is mounted in order for the user wearing the HMD 100 to voice-chat with another user, outputting audio data obtained by converting a user voice into an electrical signal. Although not shown in FIG. 3, the microphone 126 is built between the light-emitting marker 110c and the light-emitting marker 110d in the case 108. The microphone 126 is preferably a stereo microphone; however, it is also practicable to use a monaural microphone.

A communication control block 128 transmits data entered from the control block 120 to the external information processing apparatus 10 through a network adaptor or an antenna in a wired or wireless manner. Also, the communication control block 128 receives data from the information processing apparatus 10 through a network adaptor or an antenna in a wired or wireless manner and outputs the received data to the control block 120.

Receiving image data or audio data from the information processing apparatus 10, the control block 120 supplies the received image data or audio data to a display panel 130 that shows the supplied image data or an audio output block 132 to sound the supplied audio data. In addition, the control block 120 causes the communication control block 128 to transmit sensor information from the attitude sensor 124 and audio data from the microphone 126 to the information processing apparatus 10.

Figure 5:
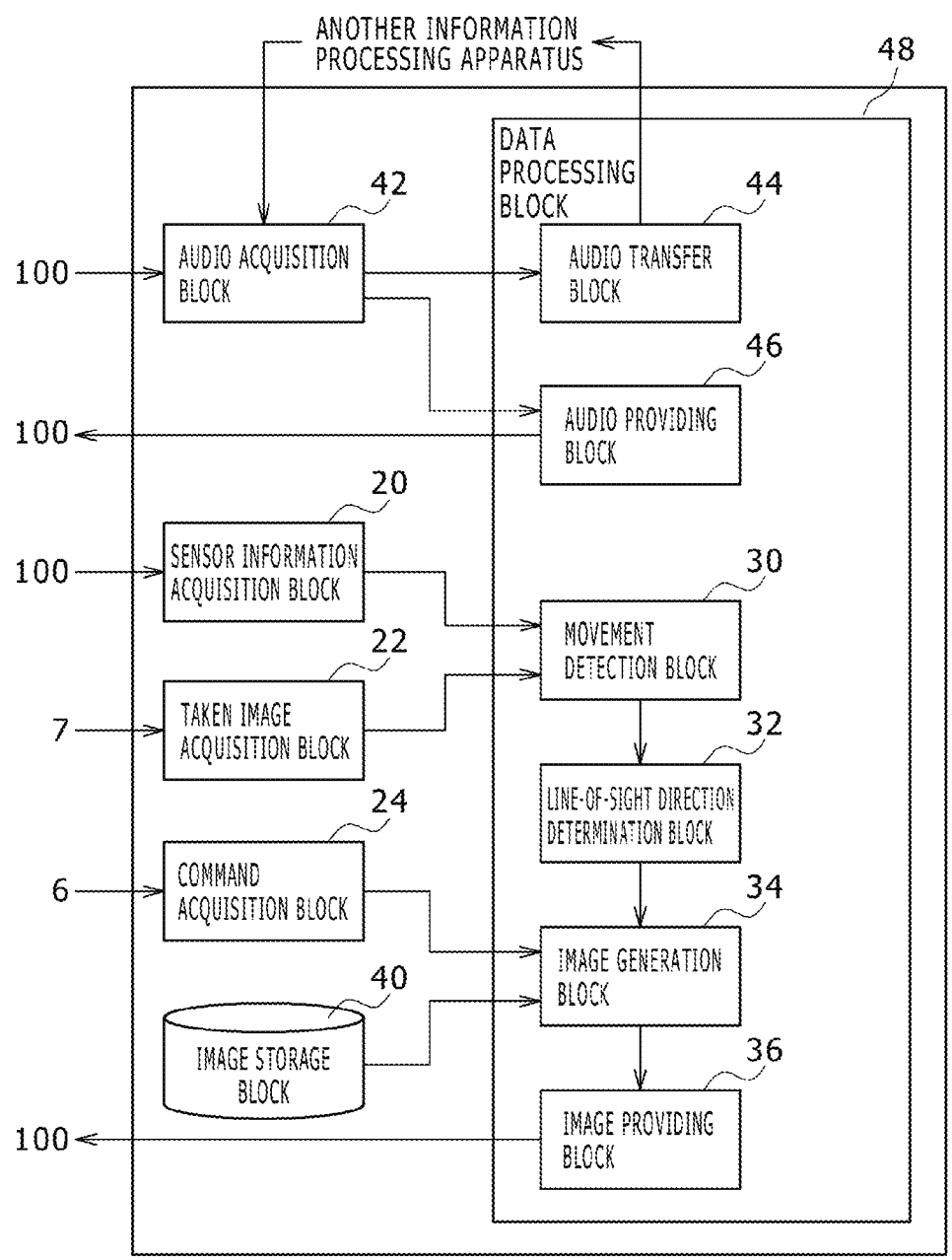
FIG. 5 is a block diagram illustrating functional blocks of the information processing apparatus.

Referring to FIG. 5, there is shown a block diagram illustrating functional blocks of the information processing apparatus 10. The information processing apparatus 10 has a sensor information acquisition block 20, a taken image acquisition block 22, a command acquisition block 24, and an audio acquisition block 42 as input interfaces with the outside.

The sensor information acquisition block 20 acquires sensor information at predetermined intervals from the attitude sensor 124 of the HMD 100. The taken image acquisition block 22 acquires a taken image of the HMD 100 at predetermined intervals from the image taking apparatus 7. For example, the image taking apparatus 7 takes an image every ($\frac{1}{120}$) second and the taken image acquisition block 22 acquires the taken image every ($\frac{1}{120}$) second. The command acquisition block 24 acquires a command entered by the user through the input apparatus 6.

The audio acquisition block 42 acquires audio data (a signal based on sound detected by the microphone 126 of the HMD 100) outputted from the HMD 100. In addition, the audio acquisition block 42 also acquires audio data transmitted from another information processing apparatus (typically, an information processing apparatus that is operated by another user wearing an HMD) through a communication block and a communication network (the Internet or the like), not shown.

The information processing apparatus 10 further has a data processing block 48 that executes data processing for generating image data and audio data to be outputted from the HMD 100 and data processing for transmitting the generated image data and audio data to the HMD 100. The data processing block 48 has a movement detection block 30, a line-of-sight direction determination block 32, an image generation block 34, an image providing block 36, an audio transfer block 44, and audio providing block 46.

The movement detection block 30 detects an attitude of the HMD 100 worn on the head of the user. The line-of-sight direction determination block 32 defines a line-of-sight direction in accordance with an attitude of the HMD 100 detected by the movement detection block 30. The image generation block 34 generates an image in accordance with the detected attitude of the HMD 100; to be more specific, the image generation block 34 generates an image based on a line-of-sight direction determined by the line-of-sight direction determination block 32. The image providing block 36 provides the generated image to the HMD 100.

Of the audio data acquired by the audio acquisition block 42, the audio transfer block 44 transmits the audio data entered from the HMD 100 to another information processing apparatus. Of the audio data acquired by the audio acquisition block 42, the audio providing block 46 transmits the audio data entered from the other information processing apparatus to the HMD 100. Consequently, a voice chat between the user wearing the HMD 100 and the other user is realized.

In FIG. 5, each element described as a functional block configured to execute various processing operations may include a circuit block, a memory, and other large-scale integrations (LSIs) in a hardware approach and realized by programs and so on loaded in the memory in a software approach. Therefore, those skilled in the art understand that these functional blocks are realized in various forms; namely, these functional blocks are realized only by hardware, only by software, and combinations thereof, but not limited thereto.

An image storage block 40 stores 360-degree panoramic image data taken in advance. The image storage block 40 may store two or more content images which may be still images or moving images. The image storage block 40 of the embodiment stores vertically and horizontally omnidirectional panoramic image data. The information processing apparatus 10 provides omnidirectional panoramic images to the user wearing the HMD 100. Therefore, when the user rotates his or her head to the left or to the right (the user may bodily turn to the left or to the right) so as to rotate the horizontal line of sight to the left or to the right, a panoramic image in the left direction or the right direction is displayed on the display panel 130 of the HMD 100; when the user tilts his or her head upward or downward so as to vertically tilt the line of sight, a panoramic image in the up direction or the down direction is displayed on the display panel 130 of the HMD 100.

Figure 6:
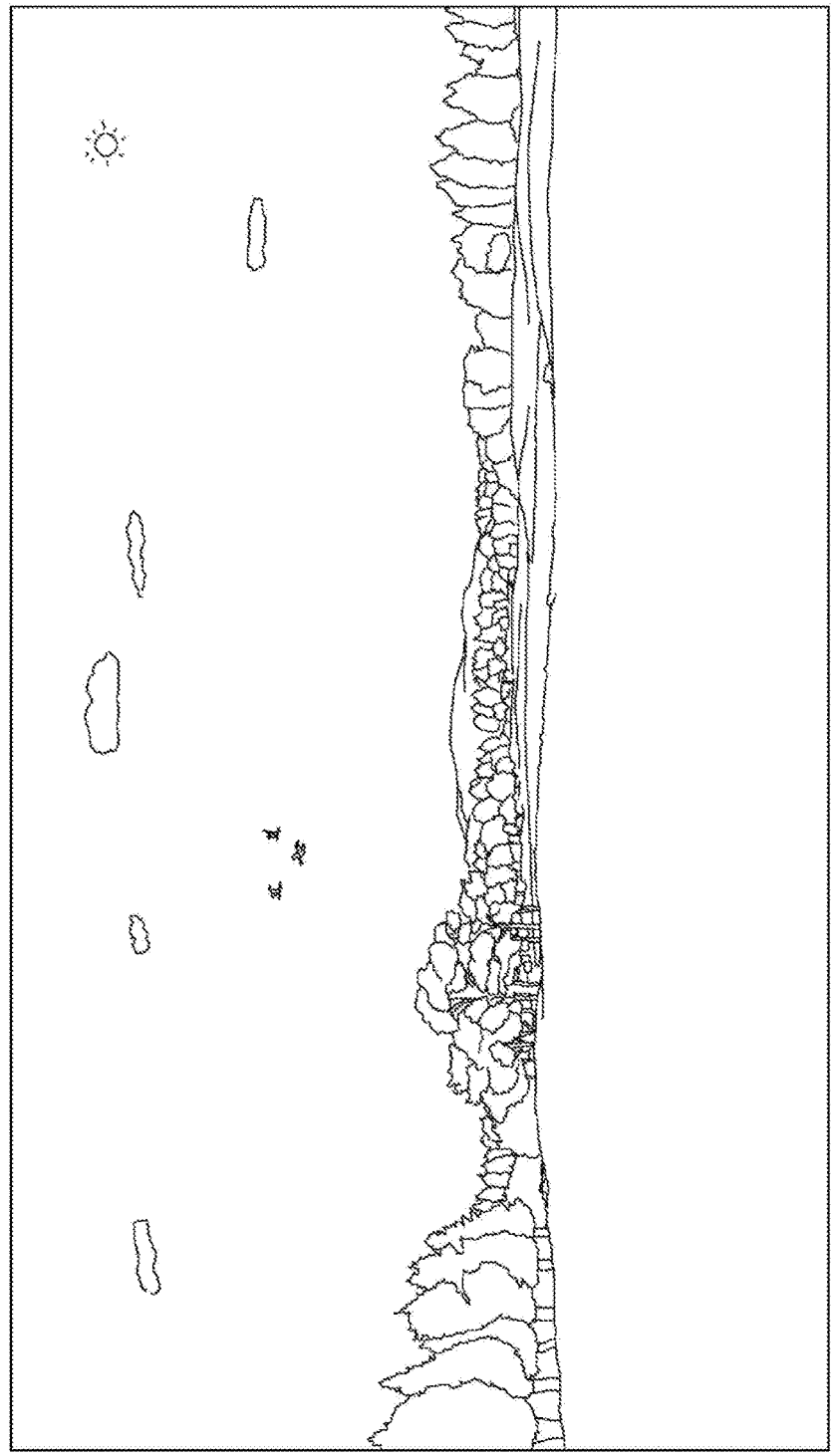
FIG. 6 is a diagram illustrating panoramic image data that is stored in an image storage block.

Referring to FIG. 6, there is shown a diagram illustrating panoramic image data stored in the image storage block 40. For the convenience of description, FIG. 6 shows part of vertical and horizontal omnidirectional panoramic image data, omitting part of an image downward from the horizontal plane and part of an image in the horizontal direction. As described before with reference to FIG. 2, an image obtained by rendering a panoramic image attached to the inner circumferential surface of a virtual sphere is displayed on the display panel 130 of the HMD 100; when the user changes his or her line of sight by moving the rotational angle and tilt of the HMD 100, the displayed panoramic image is moved in accordance with the line-of-sight direction.

In the HMD 100, the communication control block 128 transmits sensor information acquired by the attitude sensor 124 at predetermined intervals to the information processing apparatus 10. The image taking apparatus 7 takes an image of the HMD 100 at predetermined intervals and transmits the taken image to the information processing apparatus 10. Referring to FIG. 5, the sensor information acquisition block 20 acquires sensor information of the attitude sensor 124 and supplies the acquired sensor information to the movement detection block 30. The taken image acquisition block 22 acquires a taken image and supplies the acquired taken image to the movement detection block 30.

By detecting an attitude of the HMD 100, the movement detection block 30 executes head tracking processing for detecting an attitude of the head of the user wearing the HMD 100. This head tracking processing is executed to cause the view field displayed on the display panel 130 of the HMD 100 to follow an attitude of the head of the user. In the head tracking processing in the embodiment, a rotational angle to the horizontal reference direction of the HMD 100 and a tilt angle to the horizontal plane are detected. The horizontal reference direction may be set as a direction in which the HMD 100 is directed when the power thereto is turned on, for example. The horizontal reference direction may be said to be the position of the origin or the direction of the origin of a virtual reality space (hereafter referred to as "VR space") that is formed by panoramic image data.

For this head tracking processing, the movement detection block 30 may use a known technique in order to detect a rotational angle to the horizontal reference direction of the HMD 100 and a tilt angle to the horizontal plane only from the sensor information supplied by the attitude sensor 124; however, it is preferable to further use results of image-taking the light-emitting markers 110 for tracking so as to enhance detection accuracy. The movement detection block 30 detects a rotational angle and a tilt angle with predetermined intervals. For example, if an image to be supplied to the HMD 100 is 120 frames per second (fps), then it is preferable to execute the detection processing of the movement detection block 30 also at intervals of ($\frac{1}{120}$) second.

The line-of-sight direction determination block 32 determines a line-of-sight direction in accordance with an attitude of the HMD 100 detected by the movement detection block 30. This line-of-sight direction is a line-of-sight direction of the user and, at the same time, a line-of-sight direction (an optical axis direction) of the virtual camera 8 arranged at the center point 9 in a virtual sphere (see FIG. 2). Here, the line-of-sight direction determination block 32 may determine a rotational angle and a tilt angle detected by the movement detection block 30 as a line-of-sight direction (an optical axis direction) of the virtual camera 8 without change or determine a line-of-sight direction of the virtual camera 8 after executing some correction processing. For example, if stable sensor information is not provided to the movement detection block 30 due to a noise put on sensor information, then it is possible for the movement detection block 30 to detect a vibrant movement although the user does not move his or her head. In such a case, the line-of-sight direction determination block 32 may execute smoothness correction on the movement detected by the movement detection block 30, thereby determining a line-of-sight direction.

Further, a human view field is vertically asymmetric, so that the lower side of a line-of-sight is slightly wider than the upper side. Therefore, the line-of-sight direction determination block 32 may tilt slightly downward the tilt angle detected by the movement detection block 30, thereby determining the line-of-sight direction of the virtual camera 8.

The image generation block 34 generates an image in accordance with an attitude of the HMD 100 detected by the movement detection block 30 or, to be more specific, generates an image based on the line-of-sight direction of the virtual camera 8 determined by the line-of-sight direction determination block 32. The image generation block 34 determines the view field for the left eye and the view field for the right eye that are identified in the line-of-sight direction and renders the images for the left eye and the right eye, thereby generating these images. At this moment, the image generation block 34 generates a panoramic image corrected in the distortion caused by the passing of an image light from the display panel through an optical lens.

The HMD 100 of the embodiment provides the user with a view field of approximately 100 degrees in the horizontal direction and approximately 100 degrees in the vertical direction. As shown in FIG. 2, in the virtual sphere, the taken image 5 is taken with an angle of view of approximately 100 degrees horizontally and approximately 100 degrees vertically to be displayed on the display panel 130 of the HMD 100. It should be noted that the human view field is slightly wider in the lower side of the line-of-sight than the upper side as described above, so that the optical lens and the display panel 130 may be tilted by five degrees to the opposite direction of the eyes in the HMD 100, thereby realizing a vertical view field of 45 degrees upper side and 55 degrees lower side by the arrangement of the optical lens and the display panel 130.

Figure 7:
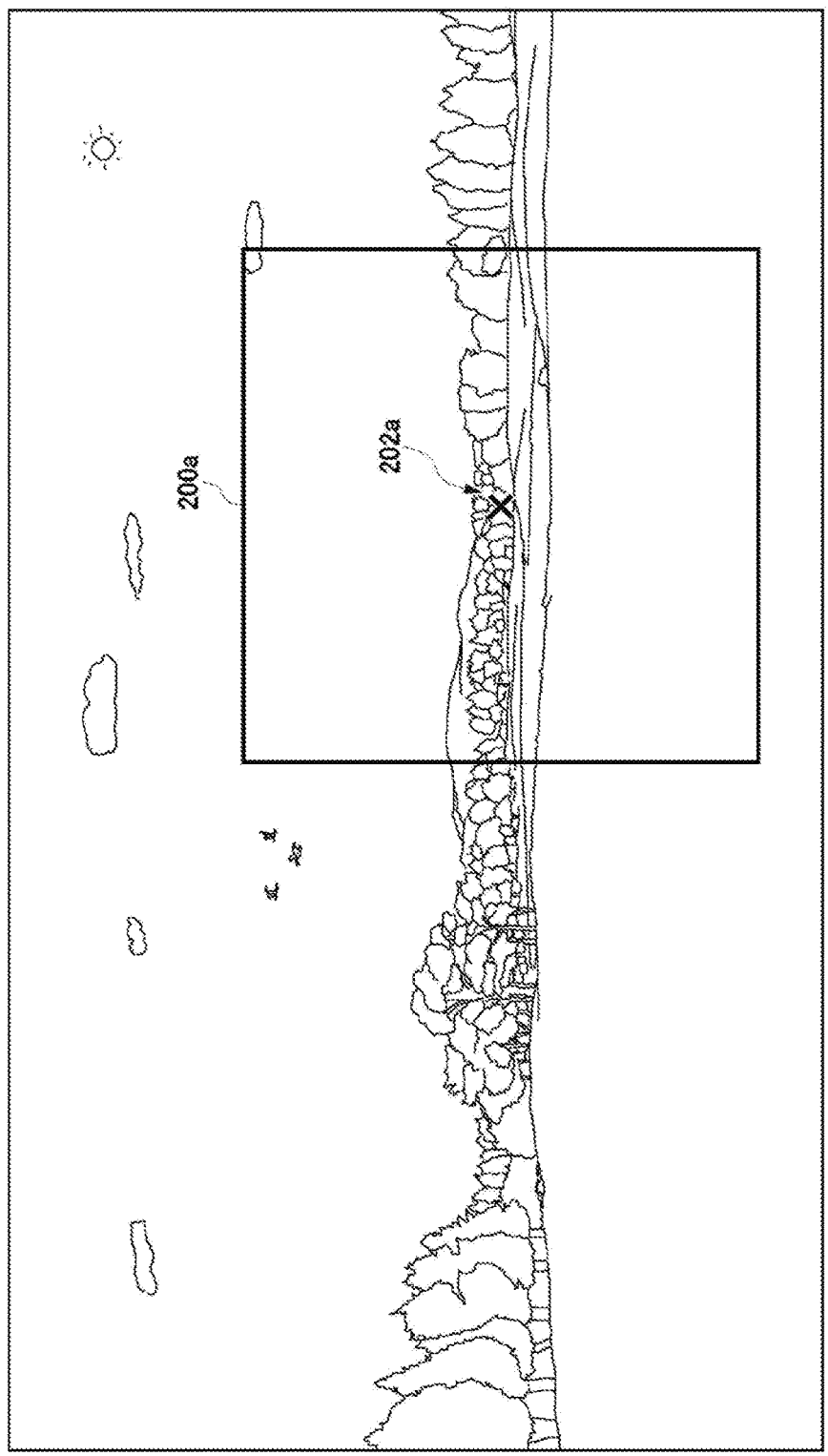
FIG. 7 is a diagram illustrating a display image.

Referring to FIG. 7, there is shown a diagram illustrating a display image 200a that is generated by the image generation block 34. It should be noted that, in FIGS. 7 through 9, in order to make easy the understanding of a positional relationship of a display image and an entire panoramic image, the display image is expressed as an image to be cut out in the panoramic image.

The image generation block 34 generates an image based on a line-of-sight direction 202a determined by the line-of-sight direction determination block 32. It should be noted that, actually, the image generation block 34 generates a display image for the left eye and a display image for the right eye by rendering each. Although these display images are different images each having a parallax, generating each of the images for both eyes will not especially separately explained below. The image providing block 36 provides the display image 200a generated by the image generation block 34 to the HMD 100. In the HMD 100, the control block 120 makes the display panel 130 show the display image 200a, upon which the user is able to see the display image 200a displayed on the display panel 130.

Figure 8:
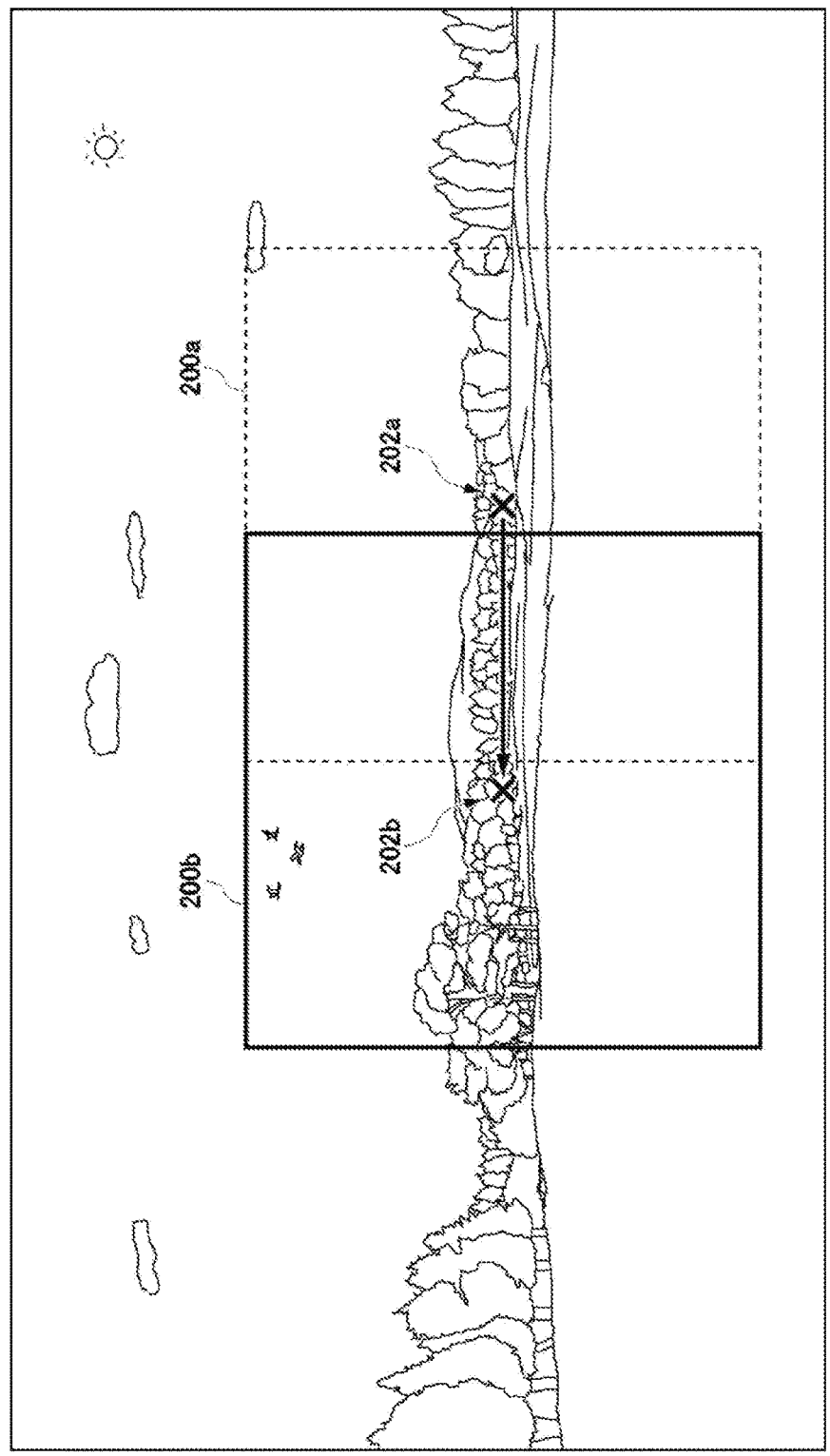
FIG. 8 is a diagram illustrating a display image.

Referring to FIG. 8, there is shown a display image 200b that is generated by the image generation block 34. The line-of-sight direction determination block 32 determines a line-of-sight direction in accordance with an attitude of the HMD 100. Then, the image generation block 34 generates an image in accordance with the determined line-of-sight direction. This example shows a manner in which the user rotates his or her head in the horizontal direction to the left and the line-of-sight accordingly continuously changes from the line-of-sight direction 202a to a line-of-sight direction 202b. Here, the user rotates his or her head by approximately 60 degrees to the left. On the basis of this rotational operation, the image generation block 34 generates an image for continuously moving a panoramic image from the display image 200a to the left rotational direction at an interval of ($1/120$) second. The image providing block 36 supplies the generated image to the HMD 100 at an interval of ($1/120$) second.

The line-of-sight direction 202a shown in FIG. 8 may be the horizontal reference direction in a VR space. That is, the line-of-sight direction 202a may be the direction in which the line-of-sight direction 202a is opposite to the direct front when the direction of the head of the user is at an initial value (namely, there is neither tilt nor rotation), or the position of the origin so to speak. In this case, the image generation block 34 generates an image corresponding to an attitude (a rotational angle and a tilt angle) of the HMD 100 to the horizontal reference direction (or the origin) in a VR space.

Figure 9:
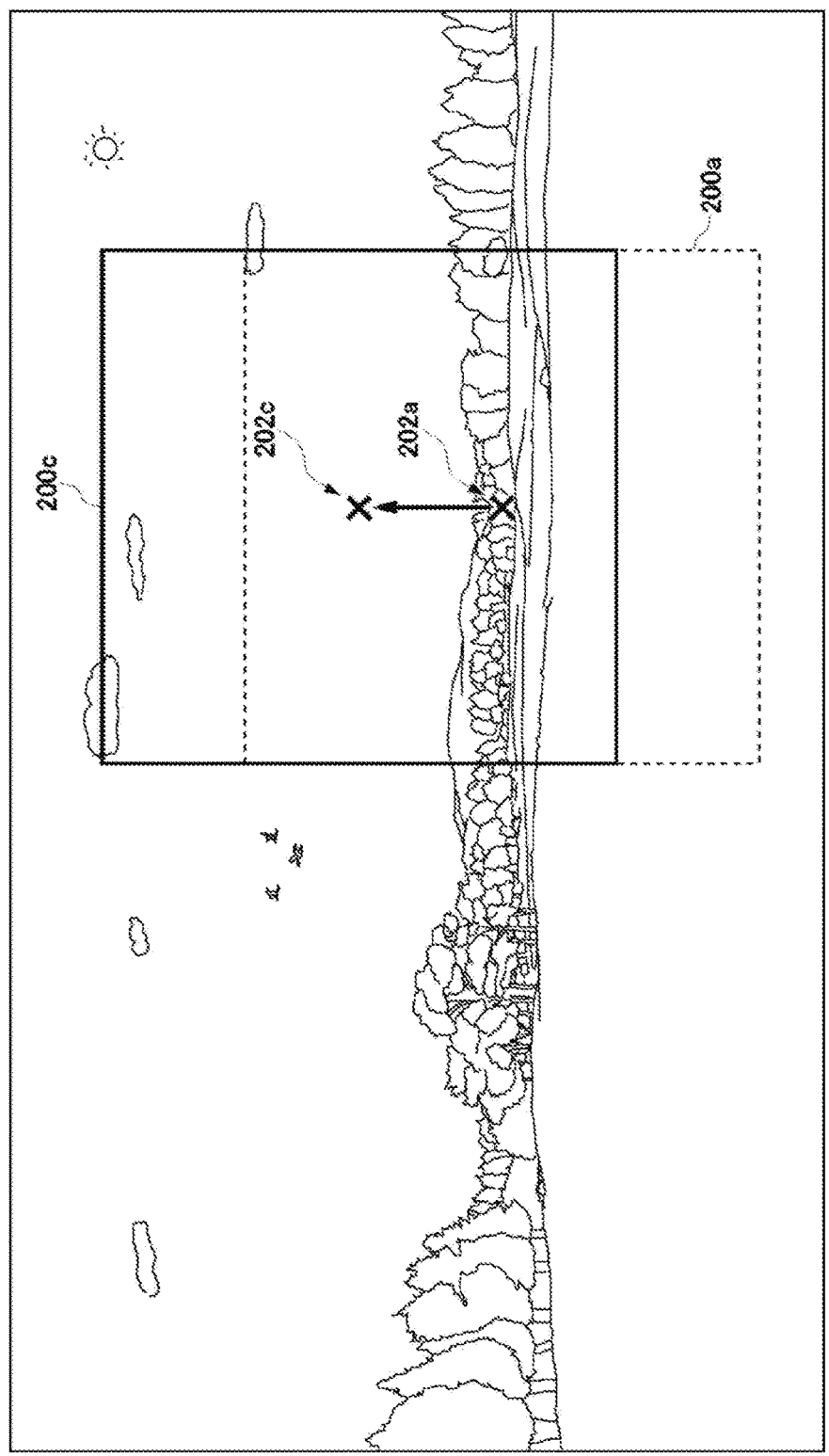
FIG. 9 is a diagram illustrating a display image.

Referring to FIG. 9, there is shown a display image 200c that is generated by the image generation block 34. The line-of-sight direction determination block 32 determines a line-of-sight direction in accordance with an attitude of the HMD 100. The image generation block 34 generates an image on the basis of the determined line-of-sight direction. This example shows a manner in which the line of sight continuously changes from the line-of-sight direction 202a to the line-of-sight direction 202c when the user tilts the head upward from a state in which the display image 200a is displayed on the display panel 130. Here, the user tilts the head by approximately 30 degrees upward. This tilting operation makes the image generation block 34 generate an image for moving a panoramic image continuously from the display image 200a to an upward direction at an interval of ($1/120$) second. The image providing block 36 provides the generated image to the HMD 100 at an interval of ($1/120$) second.

Thus, the user moves the head to change line-of-sight directions and the information processing apparatus 10 provides a panoramic image in a direction in which to watch to the HMD 100, thereby displaying the panoramic image on the display panel 130. Changing line-of-sight directions by moving the head is the same as an operation in a real world, thereby providing matching with user's senses. At this moment, when the HMD 100 provides a wide view angle to the user, the sense of immersion in a panoramic image is further enhanced.

Figure 10A:
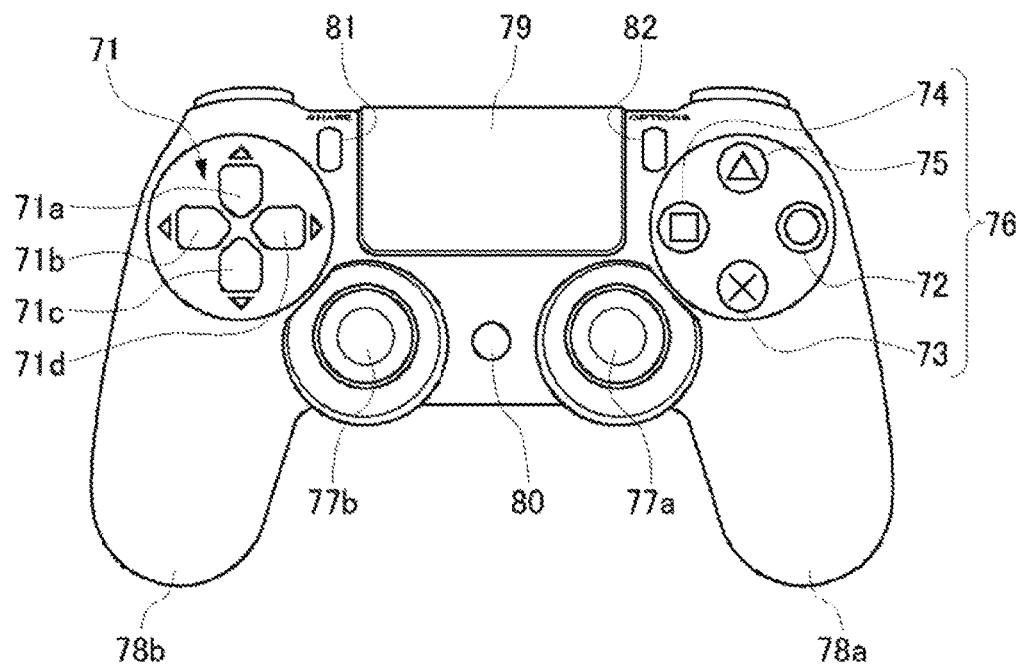
FIGS. 10A and 10B are diagrams illustrating a top view of an input apparatus and a depth side view thereof, respectively.

FIG. 10A shows a top view of the input apparatus 6. The user holds a left-side handle section 78b with the left hand and a right-side handle section 78a with the right hand, thereby manipulating the input apparatus 6. On top of the case of the input apparatus 6, there are arranged direction buttons 71, analog sticks 77a and 77b, and manipulation buttons 76. The direction buttons 71 include an up button 71a, a left button 71b, a down button 71c, and a right button 71d. The right analog stick 77a and the left analog stick 77b are for use in entering directions and tilting amounts by tilting the sticks. It should be noted that the right analog stick 77a and the left analog stick 77b sink when pressed down by the user and go up to the original position when released by the user, thus functioning as press buttons. On the top of the case, a flat area between the direction buttons 71 and the manipulation buttons 76 is arranged with a touch pad 79. The touch pad 79 also functions as a press button that sinks when pressed by the user and goes up to the original position when released by the user.

Between the right analog stick 77*a* and the left analog stick 77*b*, a home button 80 is arranged. The home button 80 is used to turn on the power to the input apparatus 6 and, at the same time, activate a communication function for wirelessly connecting the input apparatus 6 to the information processing apparatus 10. A SHARE button 81 is arranged to the left side of the touch pad 79. The SHARE button 81 is used to enter a user command to an operating system (OS) or system software in the information processing apparatus 10. An OPTIONS button 82 is arranged to the right side of the touch pad 79. The OPTIONS button 82 is used to enter a user command to an application (a game) to be executed in the information processing apparatus 10. The SHARE button 81 and the OPTIONS button 82 may be each a push button.

Figure 10B:
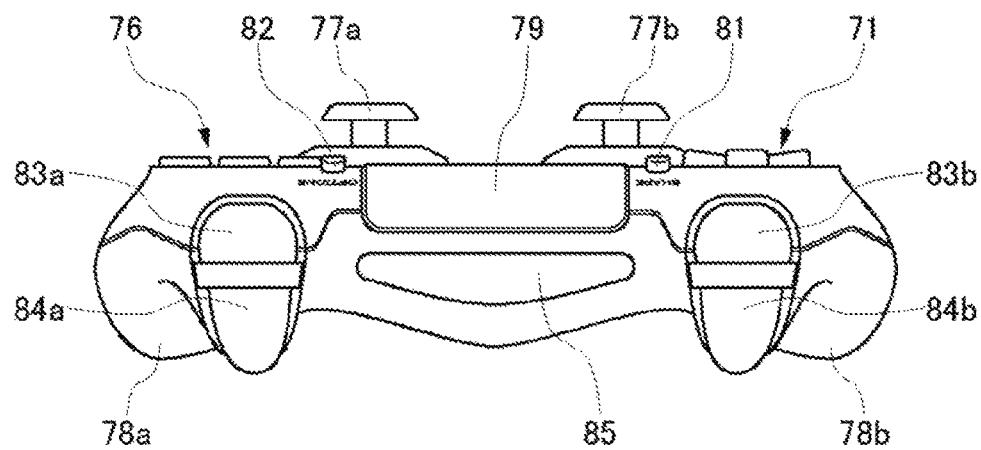

FIG. 10B shows a side surface of the depth of the input apparatus 6. On the upper side of the side surface of the depth of the case, the touch pad 79 is arranged in an extending manner as bent from the top of the case and, on the lower side of the side surface of the depth of the case, a light-emitting block 85 that is horizontally long is arranged. The light-emitting block 85 has a red (R) LED, a green (G) LED, and a blue (B) LED that are turned on in accordance with light-emitting color information transmitted from the information processing apparatus 10. An R1 button 83*a* and an L1 button 83*b* of the upper side are configured as push buttons and an R2 button 84*a* and an L2 button 84*b* of the lower side are configured as pivotally supported trigger buttons.

For example, of the manipulation members of the input apparatus 6, the left analog stick 77*b* may be used to enter a line-of-sight direction switching command. When the left analog stick 77*b* is tilted to the left, the line-of-sight direction may be moved to the left; when the left analog stick 77*b* is tilted to the right, the line-of-sight direction may be moved to the right. Thus, the left analog stick 77*b* is suitable for the user to intuitively change line-of-sight directions. It should be noted that other manipulation members, such as the right analog stick 77*a* and the direction buttons 71, may be used to enter a line-of-sight direction switching command.

Descriptions Common to First Embodiment Through Fourth Embodiment

A user wearing the HMD 100 feels difficulty in seeing the outside and making sure of things at his or her fingertips. Therefore, it is sometimes difficult for a user viewing content such as videos on the HMD 100 to enter proper manipulation information into the information processing apparatus 10 and the HMD 100 through the input apparatus 6 having many various input blocks (buttons, sticks, and so on). On the other hand, some of content only require limited kinds of manipulations. For example, content such as movies and dramas may only require the start and end of reproduction.

In order to solve these problems, mechanisms through which a user wearing the HMD 100 is able to easily enter manipulation information without arranging any new devices for manipulation are proposed, the mechanisms being practiced as the first through fourth embodiments. The configuration of the information processing system 1 of the first through fourth embodiments is generally similar to that based on the prerequisite technologies (see FIG. 1) and therefore the information already explained with respect to the prerequisite technologies is appropriately omitted.

To be more specific, in the first through third embodiments, a user wearing the HMD 100 executes contact actions, such as hitting and stroking external surfaces of the case 108 of the HMD 100, as a manipulation input into the information processing system 1. In addition, in the fourth embodiment, a user wearing the HMD 100 executes gestures, such as opening his or her hand in the proximity of the HMD 100, as a manipulation input into the information processing system 1. The information processing system 1 detects these user actions through an existing device explained with respect to the prerequisite technologies and executes data processing corresponding to the user actions.

First Embodiment

In the first embodiment, the microphone 126 arranged on the HMD 100 is used for a unit for detecting contact action done by a user. The microphone 126 detects an audio that is a vibration caused by user's contact action, a vibration of air, to be more specific. In other words, the microphone 126 detects a vibration caused by user's contact action as an audio. The data of the audio detected by the microphone 126 is transmitted to the information processing apparatus 10 through the communication control block 128. On the basis of the audio data notified from the HMD 100, the information processing apparatus 10 detects a manipulation input executed by the user.

Figure 11:
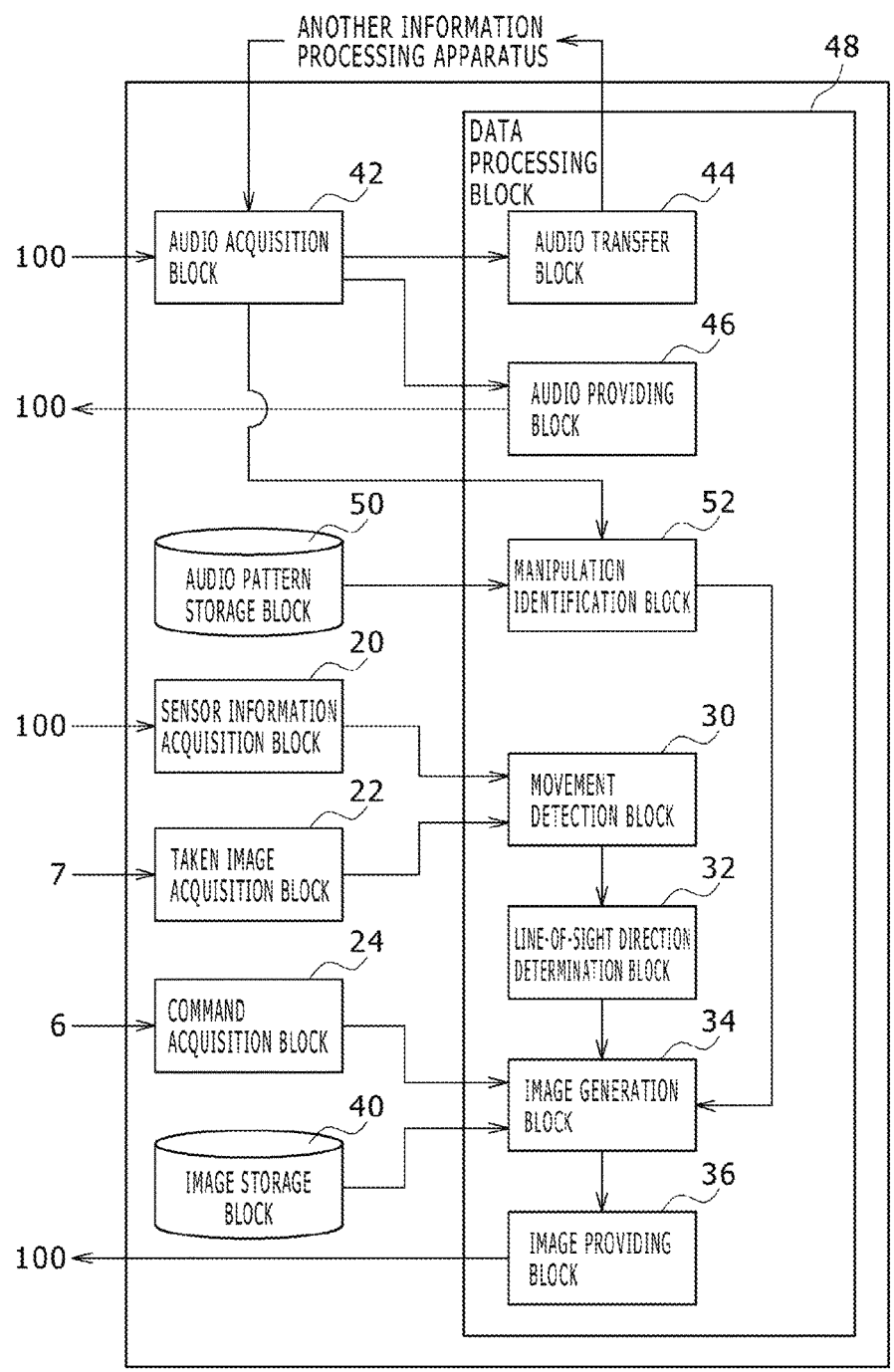
FIG. 11 is a block diagram illustrating functional blocks of an HMD practiced as a first embodiment of the disclosure.

Referring to FIG. 11, there is shown a block diagram illustrating functional blocks of the information processing apparatus 10 practiced as the first embodiment. The HMD 100 of the first embodiment has an audio pattern storage block 50 and a manipulation identification block 52 in addition the functional blocks based on the prerequisite technologies.

The audio pattern storage block 50 stores audio patterns that are detected by the microphone 126 of the HMD 100 due to a user's contact action done on the external surfaces of the case 108 (including the output mechanism block 102, the wearing band 106, and the wearing mechanism block 104) of the HMD 100 and correlations with the types of data processing associated with the HMD 100. The audio patterns stored in the audio pattern storage block 50 may be said to be air vibration patterns, hereafter referred to as "manipulation audio patterns."

The manipulation audio pattern is reference data to be compared with audio data acquired by the audio acquisition block 42. The manipulation audio pattern may be data associated with an audio waveform that is caused by a particular contact action (stroking the front left side of the case 108, for example) done on external surfaces of the case 108 of the HMD 100. For example, the manipulation audio pattern may be data indicative of characteristics such as an amplitude peak or a continuation time. Further, the manipulation audio pattern may be data associated with frequency characteristics or power spectrum data for example.

The manipulation identification block 52 acquires, from the audio acquisition block 42, audio data transmitted from the HMD 100. Acquiring audio data, the audio acquisition block 42 may output the acquired audio data to both the audio transfer block 44 and the manipulation identification block 52. In accordance with correlations stored in the audio pattern storage block 50, the manipulation identification block 52 identifies the type of data processing corresponding to the audio detected by the HMD 100. The manipulation identification block 52 notifies information indicative of the data processing of the identified type to the image generation block 34. The image generation block 34 executes the data processing of the type identified by the manipulation identification block 52, namely, the data processing of the type corresponding to the audio detected by the HMD 100.

For example, the manipulation identification block 52 executes known audio recognition processing to determine whether or not a manipulation audio pattern component is included in the audio data acquired by the audio acquisition block 42. In other words, the manipulation identification block 52 determines whether or not there is a match between the audio data outputted from the HMD 100 and the manipulation audio pattern. If the manipulation audio pattern component is found included in the audio data acquired by the audio acquisition block 42, in other words, if a match is found between the audio data and the manipulation audio data pattern, the manipulation identification block 52 identifies the type of the data processing related with that manipulation audio pattern.

In the present embodiment, the audio pattern storage block 50 stores a manipulation audio pattern and the type of a manipulation for instructing the information processing apparatus 10 or the HMD 100 to execute data processing after relating the manipulation audio pattern with the type of a manipulation. The manipulation identification block 52 identifies the type of manipulation corresponding to the audio detected by the HMD 100. The image generation block 34 determines that the manipulation identified by the manipulation identification block 52 has been entered to execute data processing corresponding to that manipulation.

The audio pattern storage block 50 may store manipulation audio patterns of two or more types and manipulations of two or more types after relating these two or more manipulation audio patterns and manipulations of two or more types. The manipulation identification block 52 may identify any one of the manipulations of two or more types in accordance with the audio data outputted from the HMD 100. To be more specific, the audio pattern storage block 50 may store the manipulation audio patterns of two or more types that are supposed to be detected by the microphone 126 of the HMD 100 as a result of contact actions on different positions on the external surface of the case 108 of the HMD 100 and the manipulation of two or more types after relating the manipulation audio patterns of two or more types with the manipulations of two or more types.

For example, the audio pattern storage block 50 may store a manipulation audio pattern caused by a manipulation of hitting the front right side of the case 108 and a determination manipulation (or an input manipulation for "Yes") after relating the manipulation audio pattern with the determination manipulation. Further, the audio pattern storage block 50 may store a manipulation audio pattern caused by a manipulation of hitting the front left side of the case 108 and a cancel manipulation (or an input manipulation for "No") after relating the manipulation audio pattern with the cancel manipulation. Still further, the audio pattern storage block 50 may store a manipulation audio pattern caused by a manipulation of hitting the wearing mechanism block 104 (on the rear side of the case 108) and an option display manipulation (or a "Return" manipulation) after relating the manipulation audio pattern with the option display manipulation.

In addition, the audio pattern storage block 50 may store manipulation audio patterns of two or more types supposed to be detected by the microphone 126 of the HMD 100 as a result of contact actions of two or more different types on the same position on the external surface of the case 108 of the HMD 100 and manipulation of two or more types after relating the manipulation of audio patterns of two or more types with the manipulations of two or more types. For example, the audio pattern storage block 50 may store a manipulation audio pattern caused by a manipulation of hitting the front right side of the case 108 with the side of a finger and a determination manipulation after relating the manipulation audio pattern with the determination manipulation. Further, the audio pattern storage block 50 may store a manipulation audio pattern caused by a manipulation of hitting the front right side of the case 108 with a finger nail and a cancel manipulation after relating the manipulation of audio pattern with the cancel manipulation. Still further, the audio pattern storage block 50 may store a manipulation audio pattern caused by a manipulation (or a flick manipulation) of stroking the right side of the front of the case 108 and an option display manipulation after relating the manipulation audio pattern with the option display manipulation.

In the information processing system 1, it is practicable to allocate only one manipulation to a contact action (hitting for example) of a user onto the outside surface of the case 108. For example, display start and display end, reproduction start and reproduction stop, or a single manipulation of OK or the like (as it were, Boolean value) may be allocated. In addition, as described above, combinations of the position of contact by a user on the external surface of the case 108 and a contact manner allow manipulation inputs of two or more types. For example, for manipulation inputs of two types, an optional manipulation between "determine" and "cancel" and a manipulation of choice between two things become practicable. In addition, for manipulation inputs of three types, a manipulation of selection among "yes," "no," and "cancel" or a manipulation of selection among "position seek (forward direction)," "position seek (reverse direction)," and "reproduction start and reproduction stop" become practicable.

Two or more positions that a user selectively touches on the external surface of the case 108 of the HMD 100 are preferably determined to be positioned at which different audios are detected by the microphone 126. For example, the two or more positions may include (1) positions different in distance from the microphone 126, (2) positions different in material of the case 108, and (3) positions at which different audios are detected by two or more microphones in the case of stereo microphones. To be more specific, the two or more positions may include the front right side (between the light-emitting marker 110a and the light-emitting marker 110c shown in FIG. 3 for example) of the case 108, the front center of the case 108, the front left side (between the light-emitting marker 110b and the light-emitting marker 110d shown in FIG. 3 for example) of the case 108, and the wearing mechanism block 104 (on the rear of the case 108). The audio pattern storage block 50 may store combinations of a manipulation audio pattern corresponding to a sound generated at each of the positions and a manipulation done.

It is desirable that contact actions of two or more types by a user onto the external surface of the case 108 of the HMD 100 are actions for which different audios are detected by the microphone 126. For example, the types of contact actions may include hitting with the side of a finger, hitting with a finger nail, slowly stroking with the side of a finger, quickly stroking with the side of a finger (flicking). In addition, hitting with one finger and hitting with two fingers may be allowed. The audio pattern storage block 50 may store the combinations of manipulation audio patterns corresponding to the contact actions of these types and the operations done.

The following describes a configuration associated with the adjustment of attitude of the HMD 100 for an example of using a manipulation input method practiced as the present embodiment.

The audio pattern storage block 50 stores a predetermined audio pattern (referred here to as "attitude changing pattern") and an attitude changing manipulation after relating the predetermined audio pattern with the attitude changing manipulation. The attitude changing manipulation may be said to be a manipulation for rotating a display image on the HMD 100 or a manipulation for rotating a line-of-sight direction in a VR space. If the audio data outputted from the HMD 100 includes a component of an attitude changing pattern, the manipulation identification block 52 detects that an attitude changing manipulation has been entered.

As described before with reference to the prerequisite technologies, the image generation block 34 generates an image in a VR space to be displayed on the HMD 100 in according with the attitude of the HMD 100. When an attitude change manipulation is entered from the manipulation identification block 52, the image generation block 34 of the first embodiment changes images in the VR space due to the change in the attitude of the HMD 100. To be more specific, as shown with reference to FIG. 8 of the prerequisite technologies, the image generation block 34 determines that the line-of-sight direction has changed to the direction indicated by the attitude change manipulation and generates a new display image in the VR space on the basis of the line-of-sight direction after change. For example, every time an attitude change manipulation is entered, the attitude may be rotated by 30 degrees to the direction indicated by that manipulation.

The audio pattern storage block 50 may store an attitude change pattern and a turn-back attitude change manipulation after relating the attitude change pattern with the turn-back attitude change manipulation. The turn-back attitude change manipulation is a manipulation for rotating the line-of-sight direction by 180 degrees; in other words, the turn-back attitude change manipulation gives a command to the user to look back. When a turn-back attitude change manipulation is entered from the manipulation identification block 52, the image generation block 34 recognizes that the attitude of the HMD 100 (in other words, the line-of-sight direction in the VR space) has rotated by 180 degrees and changes the image in the VR space. For example, the direction of the virtual camera 8 in a virtual sphere may be rotated by 180 degrees, generate an image at a position that is the rear so far, and display the generated image.

In addition, the audio pattern storage block 50 may store an attitude change pattern and an attitude reset manipulation after relating the attitude change pattern with the attitude reset manipulation. The attitude reset manipulation is a manipulation for returning the attitude of the HMD 100 (the line-of-sight direction in the VR space) to the direction right opposite to the origin position. When an attitude reset manipulation is entered from the manipulation identification block 52, the image generation block 34 returns the attitude of the HMD 100 (the line-of-sight direction in the VR space) to the origin position predetermined in the VR space and generates a new display image in the VR space on the basis of the line-of-sight direction right opposite to the origin position.

For example, in the audio pattern storage block 50, a manipulation audio pattern defining an audio caused by hitting once the front left side of the case 108 of the HMD 100 may be related with an attitude change manipulation (a left rotation). Further, a manipulation audio pattern defining an audio caused by hitting once the front right side of the case 108 of the HMD 100 may be related with an attitude change manipulation (a right rotation). Still further, a manipulation audio pattern defining an audio caused by hitting once the wearing mechanism block 104 of the HMD 100 may be related with a turn-back attitude change manipulation. Yet further, a manipulation audio pattern defining an audio caused by hitting twice the wearing mechanism block 104 of the HMD 100 may be related with an attitude reset manipulation.

By hitting once the front left side of the case 108, the front right side of the case 108, or the wearing mechanism block 104, the user is able to rotate the line-of-sight direction in a VR space to easily look at a space image in a desired direction without actually moving his or her head. Subsequently, by hitting the wearing mechanism block 104 twice, the user is able to return the line-of-sight direction to the origin direction in the VR space, in other words, easily return the line-of-sight direction to a state in which the user is watching right in the front direction in the VR space.

In addition, the audio pattern storage block 50 stores a predetermined manipulation audio pattern (herein referred to as "origin reset pattern") and an origin reset manipulation after relating the predetermined manipulation audio pattern with the origin reset manipulation. This origin denotes the origin of a VR space and may be said to be a position right opposite to the line-of-sight direction in the case where the attitude of the HMD 100 is in an initial state (a state where there is neither rotation nor tilt). Alternatively, the origin may be said to be a position right opposite to the virtual camera 8 in the initial attitude in the virtual sphere shown in FIG. 2. If the audio data outputted from the HMD 100 contains an origin reset pattern component, the manipulation identification block 52 detects that an origin reset manipulation has been entered.

As described before with reference to the prerequisite technologies, the image generation block 34 generates an image of a VR space in accordance with an attitude (a rotational angle and a tilt angle) of the HMD 100 relative to the origin position (the line-of-sight direction 202a shown in FIG. 8 for example) predetermined in the VR space. When an origin reset manipulation is entered from the manipulation identification block 52, the image generation block 34 in the first embodiment resets the origin of the VR space to the current attitude of the HMD 100, in other words, to the position right opposite to the current line-of-sight direction in the VR space.

For example, the audio pattern storage block 50 may relate a manipulation audio pattern defining an audio caused by hitting once the wearing mechanism block 104 of the HMD 100 with an origin reset manipulation. In the information processing system 1, the origin of a VR space drawn on the HMD 100 may sometimes gradually offset from the position right in front of the user; if this happens, the user can reset the origin of the VR space by hitting the wearing mechanism block 104 once. According to this mode of the disclosure, the user is able to adjust the origin of a VR space to the correct position with easy manipulation.

The following describes a configuration for realizing a pointing device (a three-dimensional mouse so to speak) for use in a VR space (a virtual three-dimensional space) as a usage example of the manipulation input method of the present embodiment.

The audio pattern storage block 50 stores a predetermined manipulation audio pattern and a type of a manipulation on a (drawn) virtual object (hereafter referred to as an "object manipulation") existing in a VR space after relating the predetermined manipulation audio pattern with the type of the manipulation on the virtual object. An object to be manipulation is a character, an item, a building, or gimmick that appears in a game, for example. The type of an object manipulation may be a selection manipulation, a determination manipulation, a cancel manipulation, or an option display manipulation. Alternatively, this type may be a manipulation for changing manners of displaying an object in a VR space.

For example, a manipulation audio pattern defining an audio caused by hitting once the front right side of the case 108 may be related with a selection manipulation. In addition, an action of hitting twice the front right side of the case 108 may be related with the determination manipulation. Further, an action of hitting once the front left side of the case 108 may be related with the option display manipulation.

If audio data entered from the HMD 100 matches a manipulation audio pattern, the manipulation identification block 52 identifies an object manipulation related with that manipulation audio pattern, notifying the image generation block 34 of the identified object manipulation.

As described before with reference to the prerequisite technologies, in accordance with a line-of-sight direction defined by the line-of-sight direction determination block 32, the image generation block 34 generates an image of a VR space to be displayed on the HMD 100. When an object manipulation is notified from the manipulation identification block 52, the image generation block 34 of the first embodiment identifies an object existing in the line-of-sight direction in the VR space at that point of time. In other words, an object existing in the direction pointed at by the pointing device is identified. The image generation block 34 executes an object manipulation on the identified object notified from the manipulation identification block 52, thereby updating the image of the VR space. For example, the image generation block 34 generates an image indicative of a state in which a character existing in the line-of-sight direction, an image indicative of a result of a determination manipulation done on that character, and so on. That is, the image generation block 34 changes display manners of a character existing in the line-of-sight direction.

According to this manner, a three-dimensional mouse can be realized in a VR space and an intuitive input environment for each type object existing in the VR space can be provided to the user. For example, looking in the direction of an object to be manipulated in a VR space, the user is able to enter a desired manipulation for that object by hitting the case 108 of the HMD 100.

The following describes a configuration for realizing a manipulation for the system software installed on the information processing apparatus 10 and a manipulation for the application software, as a usage example of the manipulation input method of the present embodiment.

The system software is the software for supporting operations and usages themselves of the information processing apparatus 10 and the HMD 100, the software including a kernel and shell (the home screen displaying and the like of the information processing apparatus 10) of the information processing apparatus 10, for example. The application software is game software and media players that operate on the system software, executing the processing of drawing entertainment content and the like that are displayed on the HMD 100.

The audio pattern storage block 50 stores two or more manipulation audio patterns and two or more types of manipulations after relating the manipulation audio patterns with the manipulations that include both of manipulations on the system software (hereafter referred to as "system manipulations") and manipulations on the application software (hereafter referred to as "App manipulations"). The system manipulations include a manipulation on the home screen of the information processing apparatus 10, a manipulation for starting the execution of the application software, and a manipulation for forcibly ending the application software being executed, for example. The App manipulations include manipulations for determining, cancelling, and attitude adjusting the content being executed in a game and the like, for example.

Figure 12:
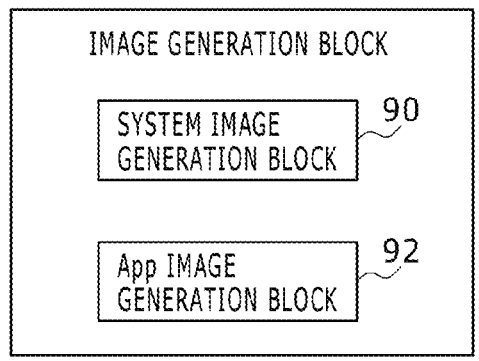
FIG. 12 is a block diagram illustrating detailed functional blocks of an image generation block.

Referring to FIG. 12, there is shown a block diagram illustrating detailed functional blocks of the image generation block 34. The image generation block 34 includes a system image generation block 90 and an App image generation block 92. The system image generation block 90 is realized by executing the system software by the central processing unit (CPU) or the graphics processing unit (GPU) of the information processing apparatus 10. The App image generation block 92 is realized by executing the application software by the CPU or the GPU of the information processing apparatus 10.

If the manipulation identification block 52 identifies a system manipulation as an input manipulation on the basis of audio data entered from the HMD 100, the system image generation block 90 generates an image of a system screen corresponding to that system manipulation. For example, an image of the home screen of the information processing apparatus 10 on which the identified system manipulation is reflected is generated. If the manipulation identification block 52 identifies an App manipulation as an input manipulation on the basis of audio data entered from the HMD 100, the App image generation block 92 generates an image of an application screen corresponding to that App manipulation. For example, an image (a VR space image or the like of a game) of an application screen to which the App manipulation identified by the manipulation identification block 52 is reflected is generated.

For example, the audio pattern storage block 50 may relate a pattern of an audio caused by hitting the front section (the side of the output mechanism block 102) of the case 108 of the HMD 100 with an App manipulation and a pattern of an audio caused by hitting the rear section (the side of wearing mechanism block 104) of the case 108 of the HMD 100 with a system manipulation. Consequently, the user is able to distinctively enter a system manipulation and an App manipulation through intuitive manipulations, thereby minimizing erroneous manipulations.

In addition, the audio pattern storage block 50 may relate a predetermined manipulation audio pattern with a manipulation for discontinuing the execution of application software (a forcible end manipulation so to speak) as a system manipulation to be related with a predetermined manipulation audio pattern. Further, a predetermined manipulation audio pattern may be related with a manipulation for discontinuing the displaying of a VR space image. If the manipulation identification block 52 identifies the above-mentioned execution discontinuation manipulation as an input manipulation on the basis of the audio data entered from the HMD 100, the system image generation block 90 may discontinue displaying of an image (a VR space image for example) of an application screen in the HMD 100. Then, the system image generation block 90 generates an image of the system screen (an image of a home screen for example) and the image providing block 36 may display the generated image of a system screen on the HMD 100 instead of an image of an application screen so far displayed.

According to this manner, an emergency action can be realized on the basis of a predetermined manipulation, such as hitting the case 108 of the HMD 100. For example, if the user wearing the HMD 100 feels dizziness by watching a VR space image, the user may hit the case 108 of the HMD 100 to discontinue displaying of the VR space image.

Referring to FIG. 11 again, the following describes a configuration of presenting a guide to a user wearing the HMD 100 so as to support the user in properly entering manipulations.

The audio pattern storage block 50 stores a pair of a manipulation audio pattern and a user manipulation after relating data (hereafter referred to as "manipulation position data") indicative that this manipulation audio pattern is a manipulation (a contact action) done on a particular position on the case 108 of the HMD 100. On the basis of the audio data entered from the HMD 100, if the manipulation identification block 52 identifies a manipulation type related with a certain manipulation audio pattern, the manipulation identification block 52 further identifies the manipulation position data related with that manipulation audio pattern, outputting the information indicative of the manipulation type and the manipulation position data to the image generation block 34.

In executing the data processing corresponding to the manipulation type identified by the manipulation identification block 52, the image generation block 34 generates the display image 200a that includes a message indicative of that manipulation type. In addition, on the basis of the manipulation position data entered from the manipulation identification block 52, the image generation block 34 generates the display image 200a that includes information indicative of user's manipulation position on the case 108 of the HMD 100. Consequently, the user is able to understand whether or not a proper manipulation has been entered, thereby supporting the manipulation input from the user to the information processing apparatus 10 or the HMD 100.

Figure 13:
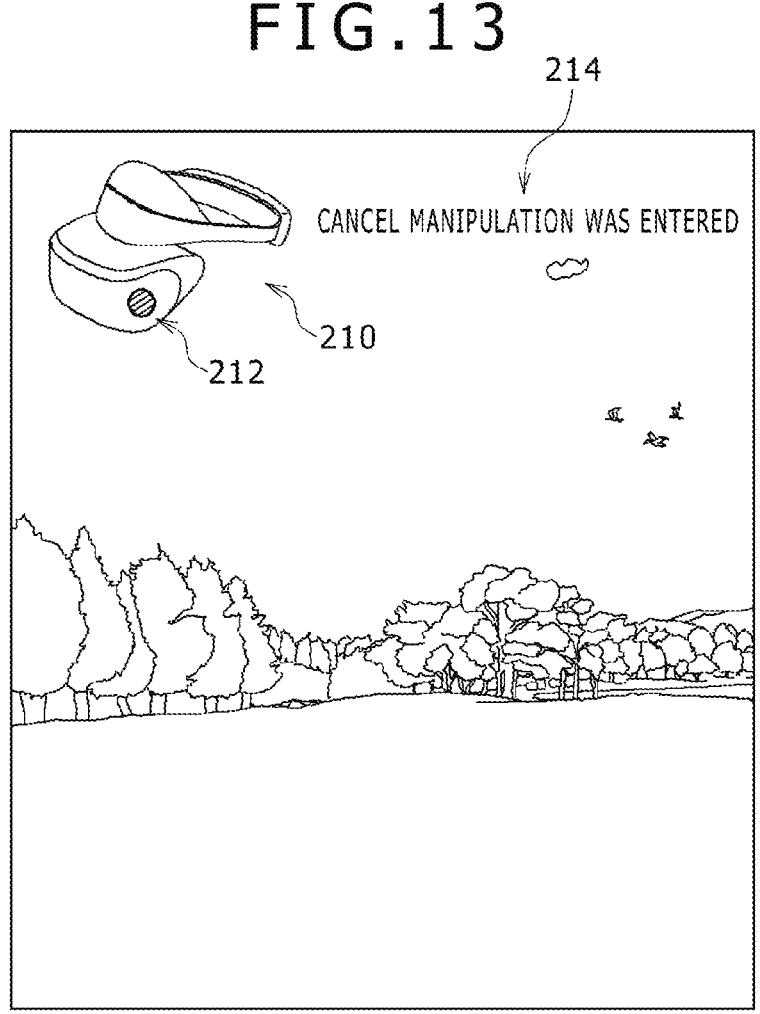
FIG. 13 is a diagram illustrating a display image.

Referring to FIG. 13, there is shown a diagram illustrating the display image 200a. Here, it is assumed that the user hit the left front side of the case 108 and that action be related with a cancel manipulation. In this case, the image generation block 34 sets an HMD image 210 indicative of an external view of the HMD 100 to the display image 200a and sets a manipulation position image 212 for informing the position of manipulation input to the position (the position indicated by the manipulation position data) hit by the user in the HMD image 210. Further, the image generation block 34 sets, to the display image 200a, a manipulation message 214 that is a message indicative of the detection of the input on the basis of a user's contact action, in other words, a manipulation message 214 that is a message indicative of the contents of the data processing executed on the basis of a user's contact action.

Figure 14:
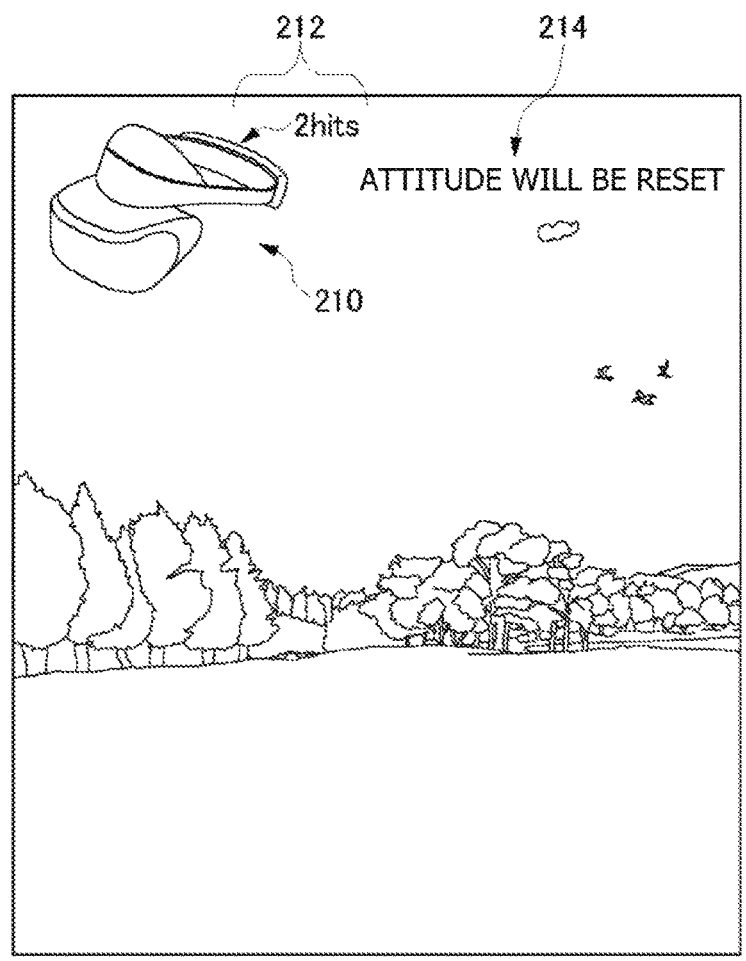
FIG. 14 is a diagram illustrating a display image.

FIG. 14 is also a diagram illustrating the display image 200a. Here, it is assumed that the user hit the rear section (namely, the wearing mechanism block 104) of the case 108 twice and this action be related with an attitude reset manipulation. In this case, the image generation block 34 resets the attitude information of the HMD 100 and, in changing the contents of a VR space image, sets the HMD image 210, the manipulation position image 212, and the manipulation message 214 to the display image 200a. It should be noted that, with the manipulation position image 212 in FIG. 14, the position (the hit position) of manipulation input by the user is indicated by an arrow mark, the manipulation position image 212 including the information indicative of the manner (the number of hits) of the manipulation input by the user.

The following describes operations of the information processing apparatus 10 of the first embodiment in accordance with the configuration explained above. As described with reference to the prerequisite technologies, the sensor information acquisition block 20 acquires sensor information outputted from the HMD 100 and the taken image acquisition block 22 acquires a taken image outputted from the image taking apparatus 7. The movement detection block 30 detects an attitude of the HMD 100 on the basis of the sensor information and the taken image and the line-of-sight direction determination block 32 defines a user's line-of-sight direction in a VR space in accordance with the attitude of the HMD 100. The image generation block 34 generates a VR space image on the basis of the line-of-sight direction defined by the line-of-sight direction determination block 32. The image providing block 36 provides the generated image to the HMD 100 to display the provided image on the HMD 100 through the output mechanism block 102.

If the user viewing a VR space image by wearing the HMD 100 wants to manipulate the system of the information processing apparatus 10 or an application being executed on the information processing apparatus 10, then the user contacts (hits typically) the external side of the case 108 of the HMD 100 in a predetermined manner. The microphone 126 of the HMD 100 detects an audio caused by the user's action and transmits the audio data to the information processing apparatus 10.

The audio acquisition block 42 acquires the audio data outputted from the HMD 100. If the acquired audio data matches a predetermined manipulation audio pattern, then the manipulation identification block 52 identifies a manipulation type related with that manipulation audio pattern. The image generation block 34 recognizes the manipulation of the type identified by the manipulation identification block 52 as the manipulation entered by the user and executes the data processing corresponding to that manipulation. Then, the image generation block 34 generates an image (a system screen or a VR space image for example) that reflects the execution results of the data processing. The image providing block 36 provides the generated image to the HMD 100. Consequently, an image that reflects a user's manipulation input of hitting the case 108 of the HMD 100 is displayed on the HMD 100.

According to the information processing system 1 practiced as the first embodiment of the disclosure, an audio caused by user's coming in contact with the external surface of the case 108 of the HMD 100 is detected by a microphone and the data processing of the type corresponding to the manners (contact position, contact way, and so on) of a user's contact action is executed. Consequently, an intuitive and simple manipulation input environment can be provided to any users for whom the manipulation of the input apparatus 6 is difficult because of blocking from the outside world.

Second Embodiment

In the second embodiment, the attitude sensor 124 (to be more specific, an acceleration sensor and a gyro sensor) arranged on the HMD 100 as a unit for detecting user's contact actions. The attitude sensor 124 detects a vibration (a vibration of the HMD 100 itself) caused by a user's contact action, in other words, detects a movement of the HMD 100 caused by a user's contact action. The attitude sensor 124 may be said to be a vibration sensor for detecting vibrations occurring on the HMD 100. A communication control block 128 of the HMD 100 transmits the sensor information acquired by the attitude sensor 124 to the information processing apparatus 10. On the basis of the sensor information entered from the HMD 100, the information processing apparatus 10 detects a manipulation input done by the user. The sensor information entered from the HMD 100 includes electrical signals indicative of the vibration and the movement detected by the attitude sensor 124, the electrical signals being referred to as "vibration data."

Figure 15:
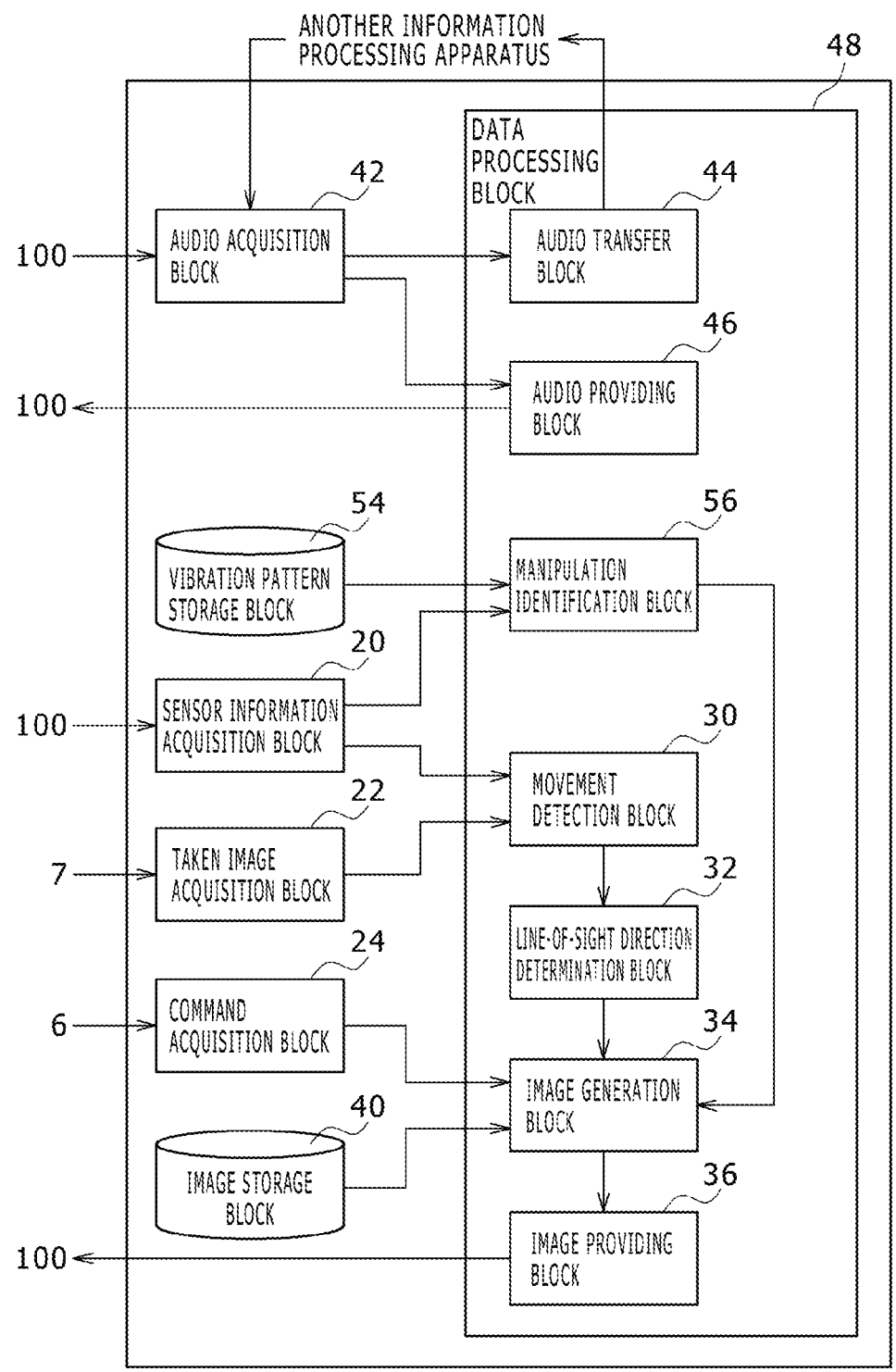
FIG. 15 is a block diagram illustrating functional blocks of an information processing apparatus practiced as a second embodiment of the disclosure.

Referring to FIG. 15, there is shown a block diagram illustrating functional blocks of the information processing apparatus 10 practiced as the second embodiment. The HMD 100 in the second embodiment includes a vibration pattern storage block 54 and a manipulation identification block 56, in addition to the functional blocks of the prerequisite technologies described before. The vibration pattern storage block 54 corresponds to the audio pattern storage block 50 of the first embodiment and the manipulation identification block 56 corresponds to the manipulation identification block 52 of the first embodiment.

The vibration pattern storage block 54 stores a correlation between a pattern of a vibration caused by a user's contact action on the outside of the case 108 (including the output mechanism block 102, the wearing band 106, and the wearing mechanism block 104) of the HMD 100 and detected by the attitude sensor 124 of the HMD 100 and a type of data processing related with the HMD 100.

The vibration pattern stored in the vibration pattern storage block 54 is hereafter referred to as a "manipulation vibration pattern." The manipulation vibration pattern is the reference data with which the vibration data acquired by a sensor information acquisition block 20 is compared. The manipulation vibration pattern may be data indicative of the characteristics of a vibration caused by a particular contact action (hitting of the front left side of the case 108 for example) on the outside of the case 108 of the HMD 100. For example, the manipulation vibration pattern may be data related with a vibration waveform (data indicative characteristics such as an amplitude peak and a continuous period of time). Further, the manipulation vibration pattern may be data related with vibration frequency characteristics (power spectral data).

The manipulation identification block 56 acquires the vibration data transmitted from the HMD 100 from the sensor information acquisition block 20. Acquiring vibration data, the sensor information acquisition block 20 may output the acquired vibration data to both the movement detection block 30 and the manipulation identification block 56. In accordance with the correlation stored in the vibration pattern storage block 54, the manipulation identification block 56 identifies the type of the data processing corresponding to the vibration detected on the HMD 100.

For example, the manipulation identification block 56 may execute known pattern matching processing to determine whether or not a manipulation vibration pattern component is included in the vibration data acquired by the sensor information acquisition block 20. In other words, the manipulation identification block 56 may execute known pattern matching processing to determine whether or not there is a match between the vibration data outputted from the HMD 100 and the manipulation vibration pattern. If a manipulation vibration pattern component is included in the vibration data acquired by the sensor information acquisition block 20, in other words, if there is a match between the vibration data and the manipulation vibration pattern, the manipulation identification block 56 identifies the type of the data processing related with that manipulation vibration pattern.

The manipulation identification block 56 notifies the image generation block 34 of the information indicative of the identified type of the data processing. The image generation block 34 executes the data processing of the type identified by the manipulation identification block 56, namely, executes the data processing of the type corresponding to the vibration detected by the HMD 100.

The information processing apparatus 10 of the first embodiment differs from the information processing apparatus 10 of the second embodiment in that the former detects a user manipulation on the basis of an audio (air vibration) detected by the microphone 126 of the HMD 100, while the latter detects a user manipulation on the basis of a vibration detected by the attitude sensor 124 of the HMD 100, the other configurations being identical in both the embodiments. Therefore, the audio data of the first embodiment can be replaced by the vibration data of the second embodiment and the manipulation audio pattern of the first embodiment by the manipulation vibration pattern of the second embodiment, thereby applying the configurations and operations described in the first embodiment to the second embodiment. In addition, the second embodiment provides generally the same effects as those of the first embodiment.

Third Embodiment

In the third embodiment, both the microphone 126 and the attitude sensor 124 (to be more specific an acceleration sensor and a gyro sensor) arranged on the HMD 100 are used as a unit for detecting user contact actions.

Figure 16:
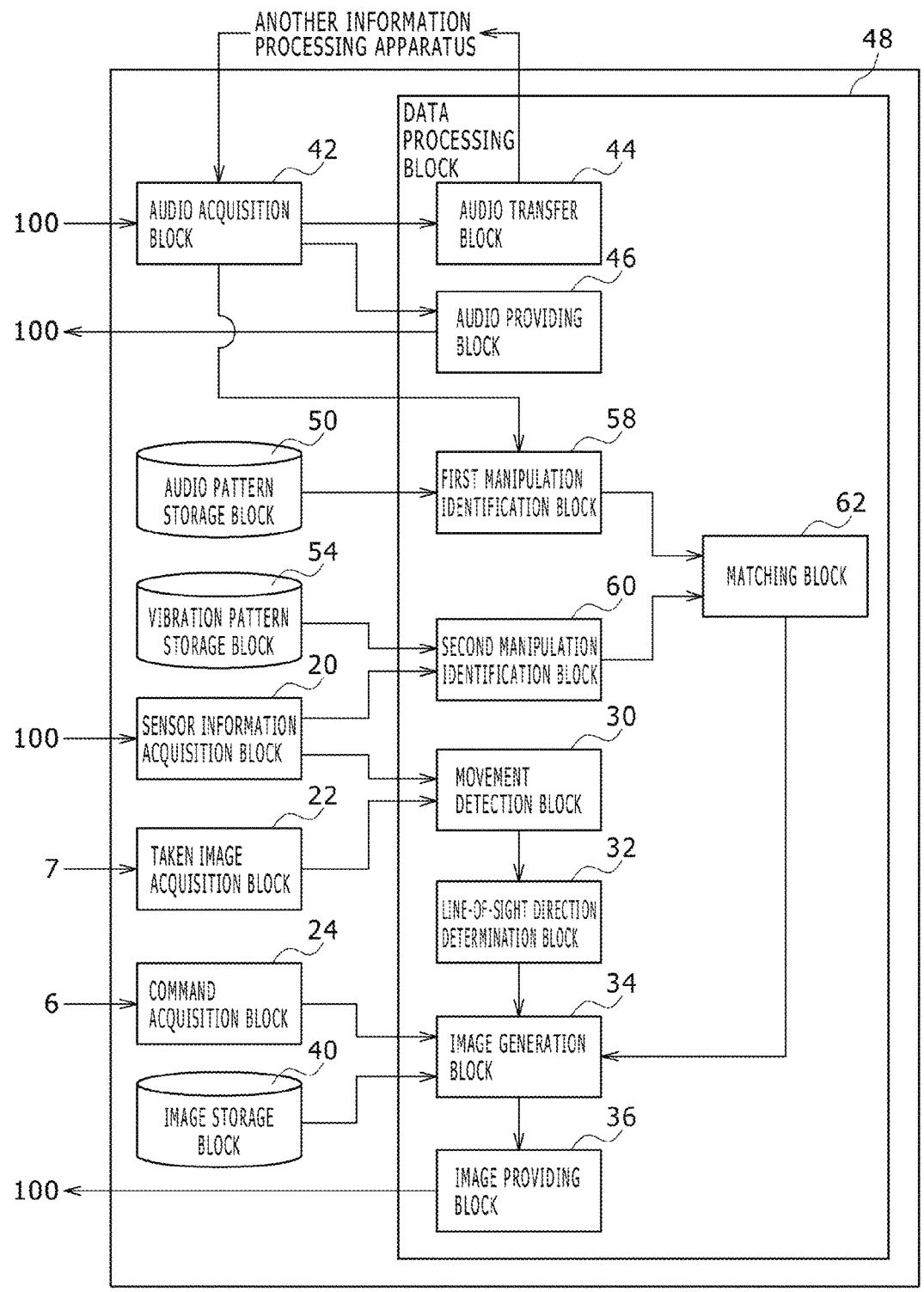
FIG. 16 is a block diagram illustrating functional blocks of an information processing apparatus practiced as a third embodiment of the disclosure.

Referring to FIG. 16, there is shown a block diagram illustrating functional blocks of the information processing apparatus 10 practiced as the third embodiment of the disclosure. The HMD 100 in the third embodiment includes an audio pattern storage block 50, a vibration pattern storage block 54, a first manipulation identification block 58, a second manipulation identification block 60, and a matching block 62, in addition to the functional blocks of the prerequisite technologies described before. The audio pattern storage block 50 and the first manipulation identification block 58 of the third embodiment are generally the same as the audio pattern storage block 50 and the manipulation identification block 52 of the first embodiment. The vibration pattern storage block 54 and the second manipulation identification block 60 of the third embodiment are generally the same as the vibration pattern storage block 54 and the manipulation identification block 56 of the second embodiment.

The matching block 62 matches a manipulation type (herein referred to as "first manipulation type") identified by the first manipulation identification block 58 on the basis of audio data entered from the HMD 100 with a manipulation type (herein referred to as "second manipulation type") identified by the second manipulation identification block 60 on the basis of vibration data entered from the HMD 100, thereby determining whether or not there is a match between both the manipulation types. If a match is found between the first manipulation type and the second manipulation type, then the matching block 62 enters the information indicative of the first manipulation type (or the second manipulation type) into the image generation block 34. The image generation block 34 executes data processing corresponding to the first manipulation type (or the second manipulation type) so as to generate an image that reflects this data processing.

On the other hand, if no match is found between the first manipulation type and the second manipulation type or if any one of the first manipulation type and the second manipulation type has not been entered, then the matching block 62 suppresses the input of the information indicative of the first manipulation type (or the second manipulation type) into the image generation block 34. That is, the audio data and the vibration data entered from the HMD 100 are handled as invalid as the data of manipulation input.

As described above, in the third embodiment, under the condition that a manipulation identified on the basis of an audio detected by the HMD 100 matches a manipulation identified on the basis of a vibration detected by the HMD 100, data processing on the basis of the identified manipulation is executed. The other configurations are generally the same as those of the first embodiment and the second embodiment; therefore, it is obvious that the configurations and the operations described in the first embodiment and the second embodiment are applicable to the third embodiment. According to the third embodiment, the accuracy with which to map a user's contact action on the HMD 100 onto a correct manipulation input, in addition to the effects provided by the first embodiment. In other words, the third embodiment can prevents the information processing apparatus 10 from detecting a manipulation that is not intended by the user and executing the unintended manipulation.

Fourth Embodiment

In the fourth embodiment, the image taking apparatus 7 is used for a unit for detecting a gesture action by a user in the proximity of the HMD 100. The image taking apparatus 7 outputs a taken image reflecting a user gesture action to the information processing apparatus 10. On the basis of a positional relationship between the HMD 100 and a user's gesture action (typically, a user's hand) identified from a taken image entered from the image taking apparatus 7, the information processing apparatus 10 detects a manipulation input done by the user.

Figure 17:
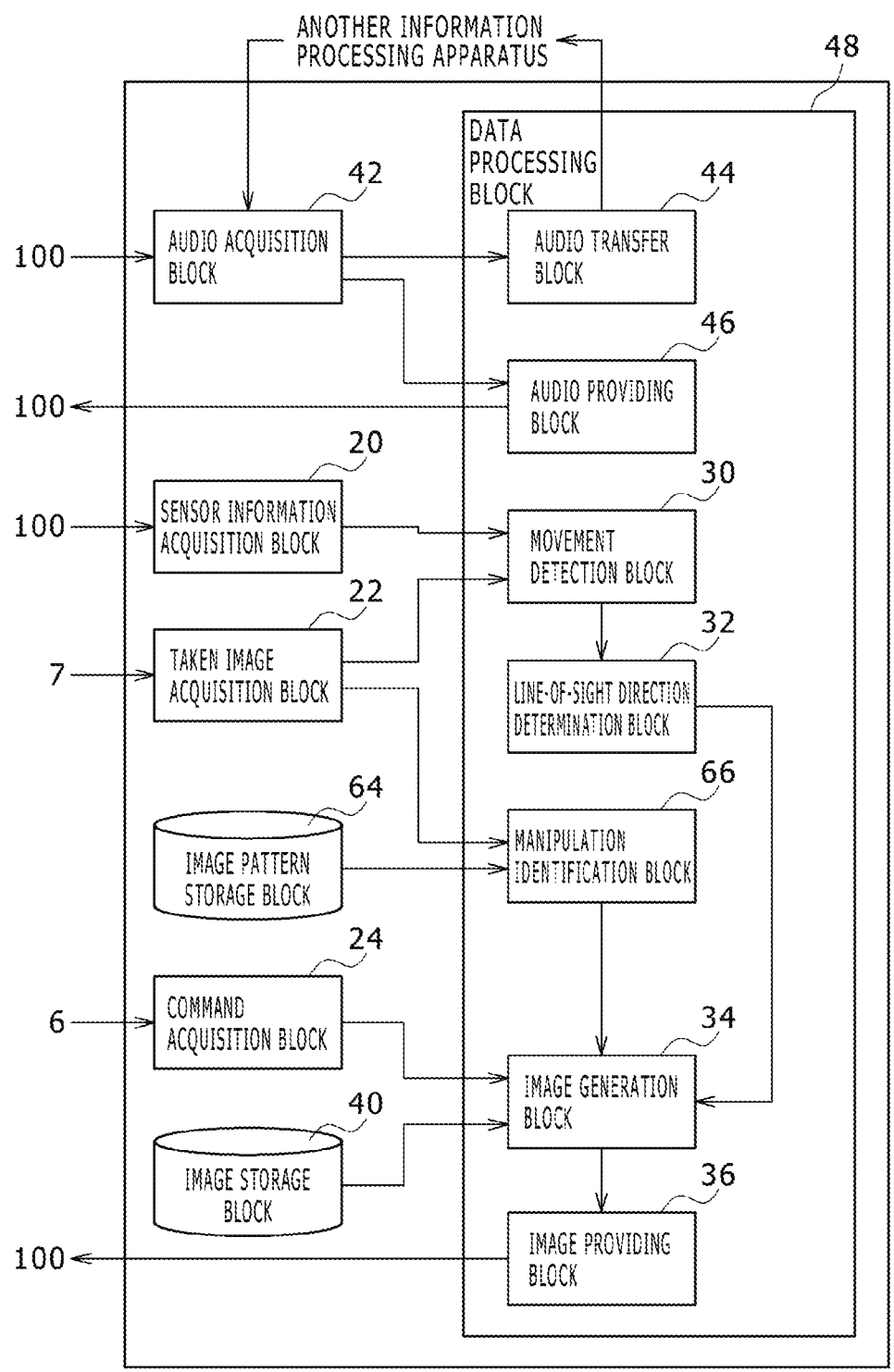
FIG. 17 is a block diagram illustrating functional blocks of an information processing apparatus practiced as a fourth embodiment of the disclosure.

Referring to FIG. 17, there is shown a block diagram illustrating functional blocks of the information processing apparatus 10 practiced as the fourth embodiment of the disclosure. The information processing apparatus 10 of the fourth embodiment includes an image pattern storage block 64 and a manipulation identification block 66, in addition to the functional blocks of the prerequisite technologies described before.

The image pattern storage block 64 stores a correlation between a pattern (hereafter referred to as "manipulation image pattern") of a taken image outputted from an image taking apparatus 7 as a result of a user's gesture action in the proximity of an HMD 100 and a type of data processing related with the HMD 100. In the present embodiment, the image pattern storage block 64 stores a manipulation image pattern and a type of a manipulation for giving a command for executing the data processing in the information processing apparatus 10 or the HMD 100 after relating the manipulation image pattern with the type of the manipulation.

A gesture action may be (1) opening one hand above the HMD 100 or (2) opening one hand by the front left side of the HMD 100. In addition, a gesture action may be (3) covering the front left side of the HMD 100 by the hand (covering the light-emitting markers 110b and 110d in a hiding manner), (4) covering the front right side of the HMD 100 by the hand (covering light-emitting markers 110a and 110c in a hiding manner), or (5) covering the total front side of the HMD 100 by both hands (covering all the light-emitting markers 110a, 110b, 110c, and 110d in a hiding manner).

A manipulation image pattern is reference data with which to compare a taken image acquired by the taken image acquisition block 22. If a particular gesture has been done in the proximity of the HMD 100, a manipulation image pattern may be an image indicative of an external view of the HMD 100 and also image data supposed to be outputted from the image taking apparatus 7 when that gesture action is done. Further, a manipulation image pattern may be data defining a characteristic of an external view of an image taken at the time when a particular gesture is done.

To be more specific, a manipulation image pattern may be data that define a positional relationship between the HMD 100 and a gesture. In addition, a manipulation image pattern may be data indicative of a positional relationship between an object (typically, a user's hand; hereafter referred to as "manipulation object") and the light-emitting markers 110a, 110b, 110c, and 110d. Further, a manipulation image pattern may be data indicative whether or not any of the light-emitting markers 110a, 110b, 110c, and 110d has been detected or not. Still further, a manipulation image pattern may be data with the detection state of each light-emitting marker and the positional relationship with a manipulation object combined.

The manipulation identification block 66 acquires a taken image transmitted from the image taking apparatus 7 from the taken image acquisition block 22. Acquiring a taken image, the taken image acquisition block 22 may output the acquired taken image to both a movement detection block 30 and the manipulation identification block 66. The manipulation identification block 66 identifies the type of data processing corresponding to the taken image in accordance with the correlation stored in the image pattern storage block 64. In the present embodiment, the manipulation identification block 66 identifies the type of a manipulation related with the taken image outputted from the image taking apparatus 7. Then, the manipulation identification block 66 notifies the image generation block 34 of the information indicative of the identified type (the type of a manipulation in the present embodiment) of data processing.

The manipulation identification block 66 may execute known template matching processing to determine whether or not a manipulation image pattern component is included in a taken image acquired by the taken image acquisition block 22, in other words, determine whether or not there is a match between the taken image and the manipulation image pattern. Further, if a manipulation image pattern component is found included in the taken image acquired by the taken image acquisition block 22, in other words, if a match is found between the taken image and the manipulation image pattern, the manipulation identification block 66 may identify the type of data processing related with that manipulation image pattern.

Still further, the manipulation identification block 66 may identify the type of data processing corresponding to a positional relationship between the HMD 100 indicated by the taken image outputted from the image taking apparatus 7 and a gesture. For example, the manipulation identification block 66 may identify the position of the HMD 100 on the basis of the positions of the light-emitting markers 110a, 110b, 110c, and 110d so as to identify an object with the distance from the image taking apparatus 7 approximating the distance between the image taking apparatus 7 and the light-emitting markers as a manipulation object, thereby identifying the positional relationship between the HMD 100 and the manipulation object. Yet further, the manipulation identification block 66 may identify an object with a distance from the HMD 100, in other words, a distance from at least one light-emitting marker existing in a predetermined range, as a manipulation object. In addition, the manipulation identification block 66 may detect a contour of the user wearing the HMD 100 from a taken image so as to identify the object linked with the contour of the user as a manipulation object.

Further, the manipulation identification block 66 may identify a manipulation image pattern that matches a detection state (detected or not detected) of each of the light-emitting markers 110*a*, 110*b*, 110*c*, and 110*d* indicated by a taken image outputted from the image taking apparatus 7 so as to identify a manipulation type related with that manipulation image pattern as a manipulation to be executed. Also, the manipulation identification block 66 may identify, from a taken image, a combination of the detection state of each light-emitting marker and a positional relationship between the HMD 100 and a manipulation object so as to identify a manipulation type related with a manipulation image pattern matching that combination as a manipulation to be executed.

The image generation block 34 executes the data processing of the type identified by the manipulation identification block 66, namely, executes the data processing of the type corresponding to a taken image outputted from the image taking apparatus 7. In the present embodiment, the image generation block 34 determines that a manipulation identified by the manipulation identification block 66 has been entered, thereby executing the data processing according to that manipulation.

The information processing apparatus 10 of the first embodiment differs from the information processing apparatus 10 of the fourth embodiment in that the former detects a user manipulation on the basis of an audio (air vibration) detected by the microphone 126 of the HMD 100, while the latter detects a user manipulation on the basis of an image taken by the image taking apparatus 7, the other configurations being identical in both the embodiments. Therefore, the audio data of the first embodiment can be replaced by a taken image of the fourth embodiment and the manipulation audio pattern of the first embodiment by the manipulation image pattern of the fourth embodiment, thereby applying the configurations described in the first embodiment to the fourth embodiment.

For example, the image pattern storage block 64 may store manipulation image patterns of two or more types and the identification information of the data processing of two or more types related with the HMD 100 (manipulations on the HMD 100 or the information processing apparatus 10) after relating these manipulation image patterns with the identification information. The manipulation identification block 66 may identify any one of the data processing of two or more types in accordance with a result of matching between a taken image outputted from the image taking apparatus 7 and a manipulation image pattern. The image generation block 34 may execute the data processing of two or more types identified by the manipulation identification block 66 so as to generate a VR space image that reflects a result of that execution.

Further, the image pattern storage block 64 may relate a forced discontinuation manipulation for the application software being executed as a system manipulation to be related with a predetermined manipulation image pattern. If a taken image of a predetermined manipulation image pattern is outputted from the image taking apparatus 7 and the manipulation identification block 66 identifies the above-mentioned forced discontinuation manipulation, the image generation block 34 (the system image generation block 90 shown in FIG. 12) may discontinue the displaying of an image of an application screen (for example, a VR space image) on the HMD 100. Then, the image generation block 34 generates an image of a system screen (for example, an image of a home screen) and the image providing block 36 may display the generated image of the system screen instead of an image of the application screen displayed so far.

Figure 18:
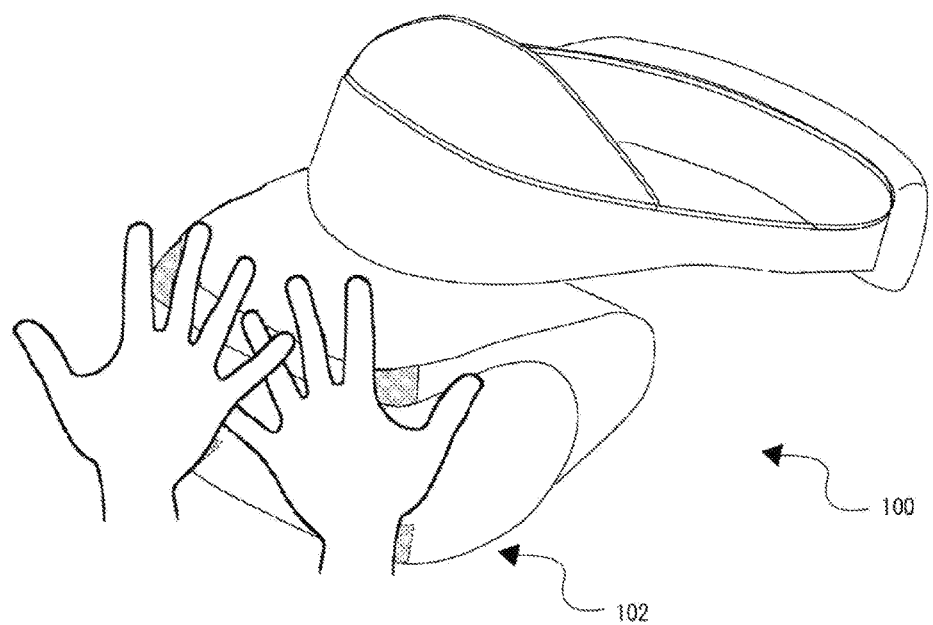
FIG. 18 is a diagram illustrating one example of a gesture.

Referring to FIG. 18, there is shown a diagram illustrating one example of a gesture. A gesture that covers the entire front side of the output mechanism block 102 of the HMD 100 (in other words, a gesture that covers all four light-emitting markers) as shown in FIG. 18 may be related with the forced discontinuation manipulation described above. For example, the image pattern storage block 64 may store a manipulation image pattern indicative that emissions of all four light-emitting markers have not been detected and the forced discontinuation manipulation described above after relating the manipulation image pattern with the forced discontinuation manipulation.

Referring to FIG. 17 again, a guide for supporting appropriate manipulation inputs may be displayed also in the fourth embodiment. To be more specific, the image pattern storage block 64 stores a set of a manipulation image pattern and a manipulation type and data indicative of a positional relationship between the HMD 100 and a gesture (hereafter referred to as "gesture position data") after relating the set with the data. The gesture position data may be data indicative of a position of a manipulation object (a user's hand for example) detected on the basis of a taken image or data indicative of a relative position of a manipulation object with the HMD 100 as reference.

Identifying a manipulation type related with a certain manipulation image pattern on the basis of a taken image entered from the image taking apparatus 7, the manipulation identification block 66 further identifies gesture position data related with that manipulation image pattern. The manipulation identification block 66 outputs the information about manipulation type and the gesture position data to the image generation block 34.

In executing the data processing based on the manipulation type identified by the manipulation identification block 66, the image generation block 34 generates a display image 200*a* that includes a message indicative of that manipulation type. In addition, on the basis of the gesture position data entered from the manipulation identification block 66, the image generation block 34 generates a display image 200*a* that includes information indicative of a gesture position relative to the HMD 100. Consequently, the user can understand whether or not a proper manipulation has been entered, which supports manipulation inputs done by the user into the information processing apparatus 10 or the HMD 100.

Figure 19:
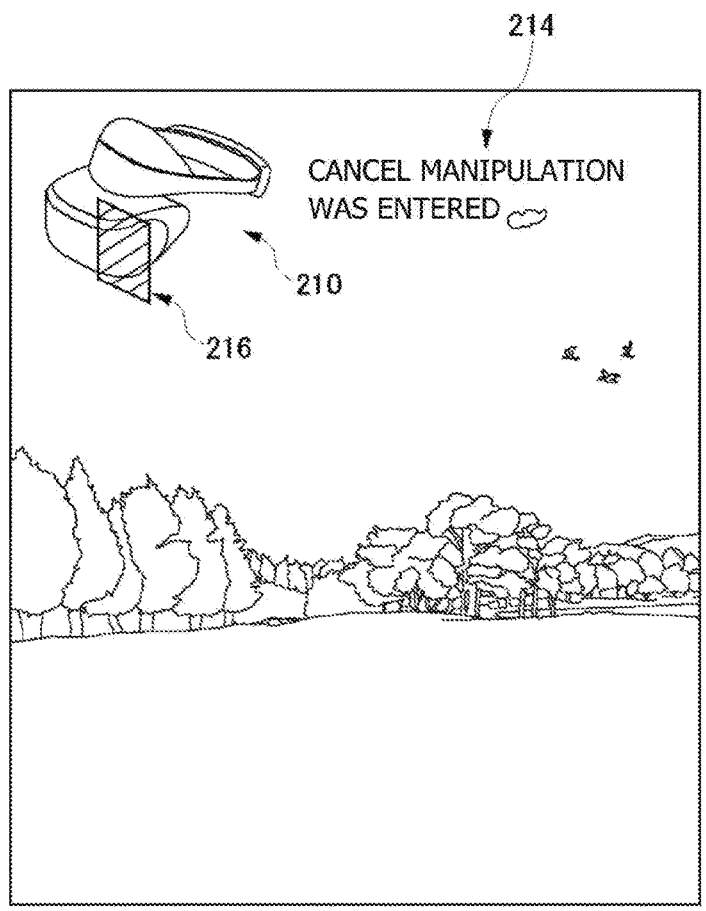
FIG. 19 is a diagram illustrating a display image.

Referring to FIG. 19, there is shown a diagram illustrating display image 200*a*. It is assumed here that the user be covering the left front section of the HMD 100 by the hand and this gesture be related with a cancel manipulation. In this case, the image generation block 34 sets an HMD image 120 indicative of an external view of the HMD 100 to the display image 200*a* and a gesture position image 216 to a position (a position indicated by the gesture position data) at which a manipulation object was detected in the HMD image 210. In addition, the image generation block 34 sets, to the display image 200*a*, a message indicative of a manipulation of which input was detected on the basis of a user's gesture, in other words, a manipulation message 214 indicative of the contents of the data processing to be executed on the basis of a user's gesture.

Figure 20:
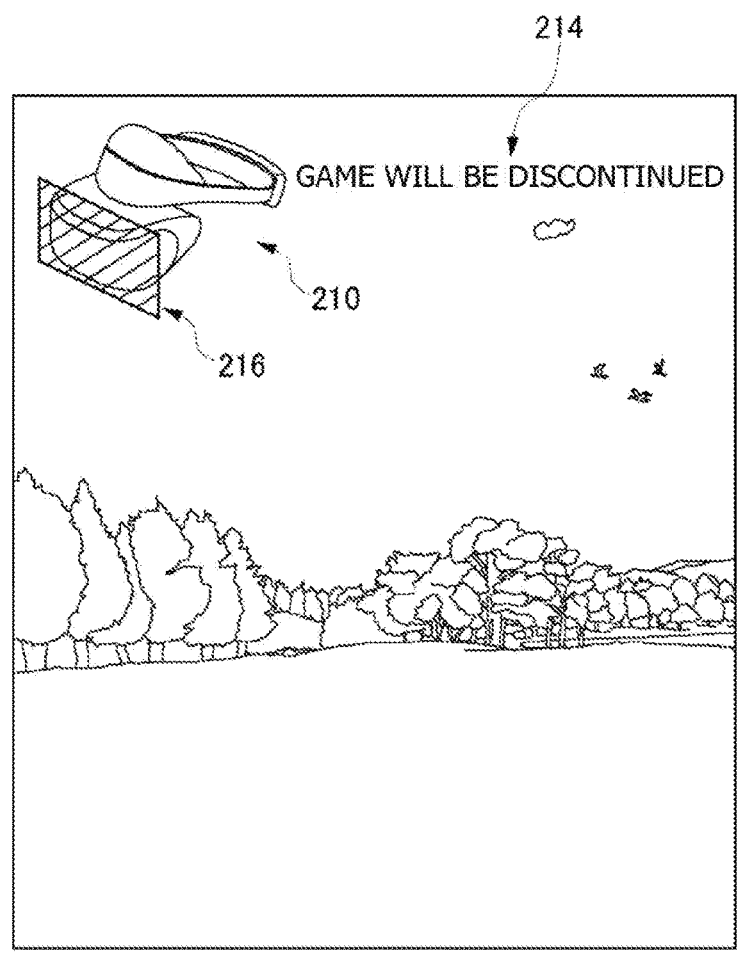
FIG. 20 is a diagram illustrating a display image.

FIG. 20 also illustrates a display image 200a. Here, as shown in FIG. 18, it is assumed that the user be covering the entire front section of the HMD 100 by both hands and this gesture be related with a manipulation that forcibly discontinues the execution of an application. In this case, in returning the displaying of a VR space drawn by an application to the displaying of a system screen, the image generation block 34 sets an HMD image, a gesture position image 216, and a manipulation message 214 to the display image 200a.

It should be noted that the attitude adjustment processing, the data processing for a three-dimensional mouse, the system manipulation, and the App manipulation described in the first embodiment may also be executed with a user's gesture used as a trigger by relating these manipulations and data processing with manipulation image patterns.

According to the information processing system 1 practiced as the fourth embodiment, a predetermined gesture done by the user in the proximity of the HMD 100 is detected by a taken image outputted from the image taking apparatus 7 and the data processing of a type in accordance with a manner of the user's gesture (the position and form of the gesture, the state of detection or no detection of the light-emitting markers of the HMD 100, and so on) is executed. Consequently, an intuitive and simple manipulation input environment can be provided to a user who is difficult to make sure of the outside. In addition, according to a manipulation input method practiced as the fourth embodiment, the user need not directly touch the HMD 100, preventing the HMD 100 from deviation.

While the present disclosure has been described with reference to the first through fourth embodiments, such description is for illustrative purpose only, and it is to be understood by those skilled in the art that changes and variations may be made in the combinations of the components and the processing processes without departing from the spirit or scope of the following claims.

Although not described in the embodiments described above, the manipulation audio pattern, the manipulation vibration pattern, and the manipulation image pattern of each of the embodiments may be stored after relating these patterns with the manipulation types that can be entered in the existing input apparatus 6. For example, the audio pattern storage block 50 of the first embodiment may store the manipulation audio patterns of the two or more types after relating the manipulation audio patterns with the manipulations of the input blocks of two or more types in the input apparatus 6. The manipulations of the input blocks of two or more types include the pressing manipulation of the up button 71a, the pressing manipulation of a triangle-mark button 75, and the right-side tilting of the right analog stick 77a, for example.

The manipulation identification block 52 identifies a manipulation audio pattern that matches the audio data entered from the HMD 100 and transfers the manipulation type of the input apparatus 6 corresponding to the identified manipulation audio pattern to the image generation block 34. In this case, the image generation block 34 may handle the manipulation type of the input apparatus 6 entered from the manipulation identification block 52 in generally the same manner as the input from the command acquisition block 24 so as to execute the data processing corresponding to the entered manipulation type.

For example, a pressing manipulation of a predetermined button (the home button 80) of the input apparatus 6 for giving a command to return from an application screen to the home screen of the system may be related with a manipulation audio pattern corresponding to the hitting twice of the wearing mechanism block 104 of the HMD 100. In this case, the manipulation identification block 52 may identify a manipulation audio pattern matching the audio data entered from the HMD 100 so as to instruct the image generation block 34 for a pressing manipulation of the home button 80. Recognizing the input of the pressing manipulation of the home button 80, the image generation block 34 may generate and display a system home screen instead of the application screen displayed so far.

In the embodiments described above, the data processing corresponding to a user's contact or gesture on the HMD 100 is executed by the information processing apparatus 10 that is different from the HMD 100. It is practicable as a variation that the data processing according to a user's contact or gesture on the HMD 100 may be executed by the HMD 100. For example, a chip or a computer program that includes the functional blocks of the information processing apparatus 10 in the embodiments described above may be installed on the HMD 100.

In the embodiments described above, in order for a user wearing the HMD 100 to enter manipulations done on the HMD 100 or the information processing apparatus 10, a predetermined contact action or a predetermined gesture is executed on the HMD 100. However, an object of the technologies described in the embodiments described above is not limited to the HMD 100. For example, these technologies are also applicable to a mobile information terminals (portable game machines or the like) each having a microphone and/or an attitude sensor (an acceleration sensor and a gyro sensor). In addition, these technologies are also applicable to mobile information terminals each having a camera. The functions of the information processing apparatus 10 described in each of the embodiments need only be mounted on these mobile information terminals.

The user is able to make a mobile information terminal execute desired data processing by executing intuitive manipulations such as hitting or stroking the mobile information terminal in a predetermined manner. Likewise, the user is able to make a mobile information terminal execute desired data processing through intuitive manipulations of executing predetermined gestures in the proximity of the mobile information terminal (inside the view angle of the camera).

Any combinations of the embodiments and variations described above are also valid as embodiments of the present disclosure. A new embodiment resulting from such combinations also has the effects of each of the combined embodiments and variations.

For example, a combination of the first embodiment (or the second embodiment or the third embodiment) and the fourth embodiment is also valid as an embodiment of the present disclosure. To be more specific, the information processing apparatus 10 may further has the image pattern storage block 64 and the manipulation identification block 66 (refer to FIG. 17) in addition to the functional blocks (refer to FIG. 11) of the first embodiment. In this case, the information processing apparatus 10 may execute two types of data processing manipulations at the same time; on the basis of an audio detected by the microphone 126 of the HMD 100, the information processing apparatus 10 identifies the type of the data processing to be executed so as to execute the manipulation of the identified data processing and, on the basis of a taken image outputted from the image taking apparatus 7, identifies the type of the data processing to be executed so as to execute the manipulation of the identified data processing. That is, the information processing apparatus 10 may separately and independently execute the manipulation detection and data processing described in the first embodiment and the manipulation detection and data processing described in the fourth embodiment.

Further, data processing may be executed with an audio (or a vibration) and an image as AND conditions. For example, if the type of the data processing identified on the basis of an audio detected by the microphone 126 of the HMD 100 matches the type of the data processing identified on the basis of a taken image outputted from the image taking apparatus 7, then the information processing apparatus 10 may execute this data processing. On the other hand, if there is a mismatch between the type of the data processing identified on the basis of an audio and the type of the data processing identified on the basis of a taken image, then the information processing apparatus 10 may suppress the execution of any one of the data processing operations. That is, under the condition that there is a match between the manipulation of which input is detected by the method of the first embodiment and the manipulation of which input is detected by the method of the fourth embodiment, the information processing apparatus 10 may execute the data processing corresponding to that manipulation input. It should be noted that the processing of the first embodiment here is replaceable by the processing of the second embodiment or the processing of the third embodiment.

It will be understood by those skilled in the art that the functions to be achieved by each of the constituent features in the claims are realized by one unit or a linkage thereof of each of the components shown in the embodiments and variations described above.

The present disclosure contains subject matter related to that disclosed in Japanese Priority Patent Application JP 2016-113855 filed in the Japan Patent Office on Jun. 7, 2016, the entire content of which is hereby incorporated by reference.

What is claimed is:

1. An information processing apparatus comprising:
    a storage block configured to store at least one of a correlation between a pattern of a vibration detected on a head-mounted display as a result of a predetermined contact action done by a user wearing the head-mounted display onto an external surface of a case of the head-mounted display and a type of data processing related with the head-mounted display and a correlation between a pattern of an image outputted from an image-taking apparatus that takes an image of the head-mounted display, the outputting being caused by a predetermined gesture action done by the user wearing the head-mounted display in the proximity thereof, and a type of data processing related with the head-mounted display;
    an acquisition block configured to acquire at least one of information related with the vibration detected on the head-mounted display and the image outputted from the image-taking apparatus;
    a data processing block configured to, according to each of the correlations stored in the storage block, execute at least one of data processing of the type corresponding to the vibration detected on the head-mounted display and data processing of the type corresponding to the image outputted from the image-taking apparatus; and
    a detection block configured to detect an attitude of the head-mounted display, wherein
    the data processing block generates an image of a virtual space to be displayed on the head-mounted display in accordance with an attitude of the head-mounted display and, if a vibration having a predetermined pattern is detected on the head-mounted display, changes the image of the virtual space by assuming that the attitude of the head-mounted display has changed.

2. The information processing apparatus according to claim 1, wherein
    the storage block stores a correlation between patterns of vibrations of a plurality of types detected on the head-mounted display as a result of a contact action on different positions on the external surface of the case of the head-mounted display and data processing operations of a plurality of types related with the head-mounted display; and
    the data processing block, in accordance with the vibration detected on the head-mounted display, executes any one of the data processing operations of the plurality of types.

3. The information processing apparatus according to claim 1, wherein
    the storage block stores a correlation between patterns of vibrations of a plurality of types detected on the head-mounted display as a result of contact actions of a plurality of types onto substantially a same position of the external surface of the case of the head-mounted display and data processing operations of a plurality of types related with the head-mounted display; and
    the data processing block, in accordance with the vibration detected on the head-mounted display, executes any one of the data processing operations of the plurality of types.

4. The information processing apparatus according to claim 1, further comprising:
    a line-of-sight direction determination block configured to determine a line-of-sight direction in accordance with an attitude of the head-mounted display detected by the detection block; wherein
    the data processing block generates an image of a virtual space to be displayed on the head-mounted display in accordance with the line-of-sight direction determined by the line-of-sight direction determination block; and
    if a vibration having a second predetermined pattern is detected on the head-mounted display, the data processing block executes predetermined data processing related with an object existing in the line-of-sight direction in the virtual space.

5. The information processing apparatus according to claim 1, wherein
    the storage block stores a pattern of an audio detected through a microphone of the head-mounted display as a pattern of a vibration detected on the head-mounted display as a result of the predetermined contact action;
    the acquisition block acquires information related with the audio detected through the microphone of the head-mounted display; and
    the data processing block executes data processing of a type corresponding to the audio detected through the microphone of the head-mounted display.

6. The information processing apparatus according to claim 1, wherein
    the storage block stores data defining a positional relationship between the gesture action and the head-mounted display as the pattern of the image; and the data processing block executes data processing of a type corresponding to a positional relationship between the gesture action indicated by an image outputted from the image-taking apparatus and the head-mounted display.

7. The information processing apparatus according to claim 1, wherein
the storage block stores a correlation between patterns of images having a plurality of types outputted from the image-taking apparatus as a result of gestures of a plurality of types in the proximity of the head-mounted display and data processing operations of a plurality of types related with the head-mounted display; and
the data processing block executes any one of the data processing operations of the plurality of types in accordance with an image outputted from the image-taking apparatus.

8. The information processing apparatus according to claim 1, wherein
the data processing block displays an image of a virtual space on the head-mounted display and, if an image having a predetermined pattern is outputted from the image-taking apparatus, discontinues the displaying of the image of the virtual space on the head-mounted display.

9. An information processing method comprising:
acquiring at least one of information related with a vibration detected on a head-mounted display and an image outputted from an image-taking apparatus that takes an image of the head-mounted display; and
executing at least one of data processing operations of executing data processing of a type corresponding to a vibration indicated by the information acquired in the acquiring in accordance with data in which a pattern of a vibration detected on the head-mounted display as a result of a predetermined contact action onto an external surface of a case of the head-mounted display by a user wearing the head-mounted display is related beforehand with a type of data processing related with the head-mounted display and executing data processing of a type corresponding to an image acquired in the acquiring in accordance with data in which a pattern of an image outputted from the image-taking apparatus as a result of a predetermined gesture action done by the user wearing the head-mounted display in the proximity thereof is related beforehand with a type of data processing related with the head-mounted display;
wherein if a vibration having a predetermined pattern is detected on the head-mounted display, an origin of a virtual space displayed on the head-mounted display is reset.

10. A non-transitory computer readable medium having stored thereon a computer program for a computer, the computer program comprising:
by a storage block, acquiring at least one of information related with a vibration detected on a head-mounted display and an image outputted from an image-taking apparatus that takes an image of the head-mounted display;
by a data processing block, executing at least one of data processing operations of executing data processing of a type corresponding to a vibration indicated by the information acquired in the acquiring in accordance with data in which a pattern of a vibration detected on the head-mounted display as a result of a predetermined contact action onto an external surface of a case of the head-mounted display by a user wearing the head-mounted display is related beforehand with a type of data processing related with the head-mounted display and executing data processing of a type corresponding to an image acquired in the acquiring in accordance with data in which a pattern of an image outputted from the image-taking apparatus as a result of a predetermined gesture action done by the user wearing the head-mounted display in the proximity thereof is related beforehand with a type of data processing related with the head-mounted display; and
by a detection block, detecting an attitude of the head-mounted display relative to an origin of a virtual space displayed on the head-mounted display, wherein
the data processing block generates an image of the virtual space in accordance with the attitude of the head-mounted display and, if a vibration having a predetermined pattern is detected on the head-mounted display, resets the origin of the virtual space.

* * * * *